(12) United States Patent
Schmitt et al.

(10) Patent No.: US 12,115,402 B2
(45) Date of Patent: ***Oct. 15, 2024

(54) REMOTE CONTROL OF WATER SUPPLY SYSTEMS

(71) Applicant: Tabor Mountain LLC, Wilmington, DE (US)

(72) Inventors: Joseph Schmitt, Whitefish, MT (US); Michael Kramer, Princeton, MN (US); Ronak Desai, Daytona, FL (US); Randall Kurtz, Plymouth, MN (US)

(73) Assignee: Tabor Mountain LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,859

(22) Filed: Oct. 19, 2023

(65) Prior Publication Data

US 2024/0108929 A1 Apr. 4, 2024

Related U.S. Application Data

(63) Continuation of application No. 18/131,474, filed on Apr. 6, 2023, now Pat. No. 11,826,594, which is a
(Continued)

(51) Int. Cl.
*G05B 15/02* (2006.01)
*A62C 3/00* (2006.01)
(Continued)

(52) U.S. Cl.
CPC ............... *A62C 37/44* (2013.01); *A62C 3/00* (2013.01); *A62C 35/60* (2013.01); *A62C 35/68* (2013.01);
(Continued)

(58) Field of Classification Search
CPC ....... E03B 7/071; Y02A 20/15; G08B 25/009; G08B 25/14; G08B 13/19682;
(Continued)

(56) References Cited

U.S. PATENT DOCUMENTS 3,844,353 A 10/1974 Herbello
4,005,754 A 2/1977 Linden et al.
(Continued)

*Primary Examiner* — Darrin D Dunn
(74) *Attorney, Agent, or Firm* — Barnes & Thornburg LLP

(57) ABSTRACT

In one implementation, a computer-implemented method includes receiving, at a computer system, information that indicates that a fire has been detected in a building and that a fire suppression system within the building has begun dousing the fire; monitoring sensor information from one or more sensors located within the building; determining, by the computer system and based on the sensor information, whether the fire has been extinguished; activating, in response to determining that the fire has been extinguished, a feature to turn off a water supply to the building, the feature being presented on a computing device for a user who is associated with the building; receiving, after activating the feature and from the computing device, a command to turn off the water supply; and transmitting, by the computer system, a control signal that causes an electromechanical device to close a water valve within the building.

20 Claims, 10 Drawing Sheets

Related U.S. Application Data continuation of application No. 17/719,017, filed on Apr. 12, 2022, now Pat. No. 11,648,430, which is a continuation of application No. 17/004,687, filed on Aug. 27, 2020, now Pat. No. 11,331,523, which is a continuation of application No. 16/153,516, filed on Oct. 5, 2018, now Pat. No. 10,758,758, which is a continuation of application No. 15/197,399, filed on Jun. 29, 2016, now Pat. No. 10,092,785, which is a continuation of application No. 14/932,413, filed on Nov. 4, 2015, now Pat. No. 9,403,046.

(60) Provisional application No. 62/075,662, filed on Nov. 5, 2014.

(51) Int. Cl.
*A62C 35/60* (2006.01)
*A62C 35/68* (2006.01)
*A62C 37/00* (2006.01)
*A62C 37/36* (2006.01)
*A62C 37/44* (2006.01)
*G05B 19/406* (2006.01)
*F24C 7/08* (2006.01)
*G08B 13/196* (2006.01)

(52) U.S. Cl.
CPC .............. *A62C 37/36* (2013.01); *G05B 15/02* (2013.01); *G05B 19/406* (2013.01); *A62C 37/00* (2013.01); *F24C 7/08* (2013.01); *G08B 13/19682* (2013.01)

(58) Field of Classification Search
CPC ........ G08B 13/19684; G08B 13/19691; G08B 13/19697; G08B 13/22; G08B 17/00; G08B 25/001; G08B 21/18; G08B 21/20; A62C 99/00; A62C 35/023; A62C 3/08; G05B 15/02; G05B 2219/2642; G06Q 10/103; Y10T 137/7761; G05D 27/02; G06F 11/0709; G06F 11/079; G06F 2221/2149; G06F 3/0482; G06F 3/04842; G06F 3/0484; G06F 9/451
See application file for complete search history.

(56) References Cited

U.S. PATENT DOCUMENTS

| | | | |
|---|---|---|---|
| 4,141,006 A * | 2/1979 | Braxton | G08B 19/00 340/505 |
| 4,868,859 A * | 9/1989 | Sheffer | G08B 29/16 379/39 |
| 5,361,198 A | 11/1994 | Harmon et al. | |
| 5,568,825 A | 10/1996 | Faulk | |
| 5,694,653 A | 12/1997 | Harald | |
| 5,794,653 A | 8/1998 | DeSmet et al. | |
| 6,029,751 A | 2/2000 | Ford et al. | |
| 6,337,635 B1 | 1/2002 | Ericksen et al. | |
| 6,766,835 B1 | 7/2004 | Fima | |
| 7,117,485 B2 | 10/2006 | Wilkinson et al. | |
| 7,145,462 B2 * | 12/2006 | Dewing | A61B 5/1117 340/628 |
| 7,468,661 B2 * | 12/2008 | Petite | G01D 4/004 702/56 |
| 7,646,294 B2 * | 1/2010 | Kow | G06F 11/327 345/689 |
| 8,013,732 B2 * | 9/2011 | Petite | G08B 25/007 702/56 |
| 8,077,026 B2 | 12/2011 | Jobe et al. | |
| 8,516,628 B2 | 8/2013 | Conroy | |
| 8,700,414 B2 | 4/2014 | Rothermel et al. | |
| 9,225,793 B2 * | 12/2015 | Dutta | H04L 67/12 |
| 9,297,150 B2 | 3/2016 | Klicpera | |
| 9,297,467 B1 | 3/2016 | Goseco | |
| 9,332,392 B1 | 5/2016 | Conway et al. | |
| 9,421,406 B2 | 8/2016 | Seebaluck et al. | |
| 9,777,470 B2 | 10/2017 | Mazz et al. | |
| 9,945,103 B2 | 4/2018 | Thompson et al. | |
| 10,866,601 B2 | 12/2020 | Halimi | |
| 10,887,125 B2 | 1/2021 | Rexach et al. | |
| 11,047,496 B1 * | 6/2021 | McConnell | G01M 3/28 |
| 11,047,761 B1 | 6/2021 | Frackelton et al. | |
| 11,449,379 B2 | 9/2022 | Gomes Pereira et al. | |
| 2002/0083768 A1 | 7/2002 | O'Shea | |
| 2002/0157017 A1 | 10/2002 | Mi et al. | |
| 2002/0166986 A1 | 11/2002 | Remby et al. | |
| 2003/0010509 A1 | 1/2003 | Hoffman | |
| 2003/0066340 A1 | 4/2003 | Hassenflug | |
| 2004/0059840 A1 | 3/2004 | Perego et al. | |
| 2005/0144151 A1 | 6/2005 | Fischman et al. | |
| 2005/0262923 A1 | 12/2005 | Kates | |
| 2006/0064263 A1 | 3/2006 | Di Palma et al. | |
| 2006/0125632 A1 | 6/2006 | Luebke et al. | |
| 2006/0181406 A1 * | 8/2006 | Petite | G08B 25/007 340/539.22 |
| 2006/0191324 A1 | 8/2006 | Garabedian et al. | |
| 2007/0008099 A1 | 1/2007 | Kimmel et al. | |
| 2009/0121860 A1 * | 5/2009 | Kimmel | G08B 25/14 340/506 |
| 2009/0293192 A1 | 12/2009 | Pons | |
| 2010/0070097 A1 | 3/2010 | Morgenstern et al. | |
| 2010/0156632 A1 | 6/2010 | Hyland et al. | |
| 2010/0274366 A1 * | 10/2010 | Fata | H04L 12/2818 700/8 |
| 2010/0304318 A1 | 12/2010 | Muff et al. | |
| 2011/0166714 A1 * | 7/2011 | Stachnik | G08B 21/20 700/282 |
| 2011/0178644 A1 | 7/2011 | Picton | |
| 2011/0284777 A1 | 11/2011 | Pitchford et al. | |
| 2012/0095600 A1 | 4/2012 | Wewalaarachch et al. | |
| 2013/0072158 A1 | 3/2013 | Brewer et al. | |
| 2013/0248023 A1 | 9/2013 | Estrada, Jr. | |
| 2013/0346882 A1 | 12/2013 | Shiplacoff et al. | |
| 2014/0289321 A1 | 9/2014 | Fata et al. | |
| 2014/0340223 A1 | 11/2014 | Ilyin et al. | |
| 2015/0330923 A1 | 11/2015 | Smullin | |
| 2015/0339917 A1 | 11/2015 | Messing et al. | |
| 2016/0041565 A1 | 2/2016 | Edwards | |
| 2016/0071047 A1 | 3/2016 | Veley | |
| 2016/0110085 A1 * | 4/2016 | Barton | H04L 12/283 715/736 |
| 2016/0314034 A1 | 10/2016 | Adinarayan et al. | |
| 2017/0142124 A1 | 5/2017 | Mukhn et al. | |
| 2019/0066464 A1 | 2/2019 | Wedig et al. | |
| 2019/0383061 A1 | 12/2019 | Shen et al. | |
| 2022/0051351 A1 | 2/2022 | Mason | |
| 2023/0204239 A1 * | 6/2023 | Gillette | G05B 15/02 700/277 |

\* cited by examiner

REMOTE CONTROL OF WATER SUPPLY SYSTEMS

CROSS REFERENCE TO RELATED APPLICATIONS

This application is a continuation of U.S. application Ser. No. 18/131,474, filed on Apr. 6, 2023, which is a continuation of U.S. application Ser. No. 17/719,017, filed on Apr. 12, 2022, which is a continuation of U.S. application Ser. No. 17/004,687, filed on Aug. 27, 2020, which is a continuation of U.S. application Ser. No. 16/153,516, filed Oct. 5, 2018, now U.S. Pat. No. 10,758,758, issued Oct. 5, 2018, which is a continuation of U.S. application Ser. No. 15/197,399, filed Jun. 29, 2016, now U.S. Pat. No. 10,092,785, issued Oct. 9, 2018, which is a continuation of U.S. application Ser. No. 14/932,413, filed Nov. 4, 2015, now U.S. Pat. No. 9,403,046, issued on Aug. 2, 2016, and claims the benefit of U.S. Provisional Application Ser. No. 62/075,662, filed Nov. 5, 2014. The disclosures of the prior applications are considered part of and are incorporated by reference in the disclosure of this application.

TECHNICAL FIELD

This document generally describes technology for remotely monitoring and controlling fire suppression systems, such as sprinkler systems that are installed in homes and other buildings.

BACKGROUND

Fire suppression systems, such as installed fire sprinkler systems, have used extinguishing components, such as sprinkler heads, that are mechanically and/or electrically activated in response to the detection of the effects of a fire (e.g., heat). Once activated, such extinguishing components will continue to extinguish/douse until a water supply for the extinguishing components is turned off.

For example, some sprinkler heads have glass bulbs that apply pressure to a cap that acts as a plug to prevent water from flowing out of the sprinkler head. Such glass bulbs are heat-sensitive, such as through the use of an internal liquid that expands in response to heat, and burst when a threshold temperature is reached, which releases the pressure on the cap and allows for water to begin flowing out of the sprinkler head. Such sprinkler heads relying on mechanical components for activation are not able to be shut off individually, but instead rely upon someone to manually turn off the water supply to the heads for them to stop extinguishing/dousing.

SUMMARY

This document generally describes technology for remotely controlling fire suppression systems. While fire suppression systems will save a building from destruction by fire, they can themselves inflict an extensive amount of water damage to a building. For example, fire suppression systems are typically deactivated by fire fighters who are responding to the fire emergency. However, response times for such fire fighters can vary greatly depending on a variety of factors, such as the distance between the building and the closest fire station and whether fire fighters in the jurisdiction are part of professional or volunteer forces (e.g., fire fighters in volunteer forces may not be on-call and instead may first need to travel to the fire station before responding to a call). During even short response times, water from an activated fire suppression system can cause a great deal of damage to a building and to personal property that is contained therein.

The technology disclosed in this document allows for minimal damage to be inflicted upon a building and property contained within the building when a fire suppression system has been activated. For instance, the technology disclosed in this document allows fire suppression systems to be activated and to fully perform their intended duty—to fully extinguish fires—while at the same time permitting for the fire suppression system to be remotely controlled and deactivated once the fire has been fully extinguished. Thus, damage can be minimized from both a fire within a building and water used to extinguish the fire in a surrounding area from the fire suppression system.

In one implementation, a computer-implemented method includes receiving, at a computer system, information that indicates that a fire has been detected in a building and that a fire suppression system within the building has begun dousing the fire; monitoring sensor information from one or more sensors located within the building; determining, by the computer system and based on the sensor information, whether the fire has been extinguished; activating, in response to determining that the fire has been extinguished, a feature to turn off a water supply to the building, the feature being presented on a computing device for a user who is associated with the building; receiving, after activating the feature and from the computing device, a command to turn off the water supply; and transmitting, by the computer system, a state change signal or control signal that causes an electromechanical device to close a water valve within the building.

Such a method can optionally include one or more of the following features. The computer system can transmit the control signal to a remote computing device that is located within the building and that is in communication with the electromechanical device. The remote computing device can include a control panel for the building. The remote computing device can include a home automation computer system for the building. The electromechanical device can include a solenoid valve that is located along the water supply for the building and at a position upstream of the fire suppression system. The computer-implemented method can further include sending, in response to receiving the information, an alert to the computing device that causes details about the fire in the building to be output to the user, wherein the feature is deactivated on the computing device at the time the details are output. The computing device can be programmed to present the feature in a user interface of the computing device. Activating the feature can include the computer system transmitting activation information to the computing device to cause the computing device to activate the feature. The computing device can be programed to prohibit user selection of the feature when the feature is deactivated, and the computing device can be programmed to permit user selection of the feature when the feature is activated. The feature can include a selectable button that is displayed in the user interface. The computer-implemented method can further include verifying, after determining that the fire has been extinguished and before activating the feature, that the fire has been extinguished. The verifying can include, after determining a first time that the fire has been extinguished, repeatedly determining whether the fire is still extinguished for a period of time using real-time sensor information from the sensors in the building. The verifying can include, after determining that the fire has been extinguished using sensor information from a first type of the sensors, determining whether sensor information from a second type of the sensors also indicates that the fire has been extinguished. The one or more sensors can include one or more of: temperature sensors, smoke detectors, thermographic cameras detecting infrared (IR) light, thermal imaging cameras, and flame detecting devices. The computing device can include a mobile computing device.

In one implementation, a computer-implemented method includes receiving, at a mobile computing device and from a computer system, a notification that a fire has been detected at a building with a fire suppression system supplied with water from a water supply; presenting, by the mobile computing device in response to receiving the notification, a user interface providing real time status information for the fire, the real time status information being provided by the computer system based on information detected by one or more sensors within the building; automatically disabling, by the mobile computing device when the user interface is initially presented, a feature for remotely turning off the water supply in the building; receiving, at the mobile computing device, extinguish information indicating that the fire has been extinguished; activating, by the mobile computing device and in response to receiving the extinguish information, the feature in the user interface; receiving, at the mobile computing device, user input selecting the activated feature in the user interface; and transmitting, by the mobile computing device and to the computer system, instructions to turn off the water supply in the building, the instructions causing the computer system to send a control signal to a device at the building to turn off the water supply to the fire suppression system.

Such a method can optionally include one or more of the following features. The notification can include a push notification on the mobile computing device, and the user interface can be presented by a mobile app that is being executed by the mobile computing device. The feature can include a selectable button, and the real time status information can include (i) information indicating whether the fire is still burning and (ii) information indicating whether the fire suppression system has been begun dispensing water onto the fire.

In one implementation, a system includes one or more sensors located within a building that are configured to detect fires in the building; an electromechanical device configured to control a water valve located along a water supply for the building and at a position upstream of a fire suppression system for the building; and a computer system with one or more processors that are programmed to: receive information that indicates that a fire has been detected in the building and that the fire suppression system within the building has begun dousing the fire; monitor sensor information from the one or more sensors located within the building; determine, based on the sensor information, whether the fire has been extinguished; activate, in response to determining that the fire has been extinguished, a feature to turn off the water supply to the building, the feature being presented on a computing device for a user who is associated with the building; receive, after activating the feature and from the computing device, a command to turn off the water supply; and transmit a control signal that causes the electromechanical device to close the water valve within the building.

Such a system can optionally include one or more of the following features. The system can further include a remote computing device that is located within the building, that is in communication with the electromechanical device, and that is programmed to: receive the control signal transmitted by the computer system, and control operation of the electromechanical device to close the water valve in response to receiving the control signal. The electromechanical device can include a solenoid valve that is located along the water supply for the building and at a position upstream of the fire suppression system. The computer system can be further programmed to send, in response to receiving the information, an alert to the computing device that causes details about the fire in the building to be output to the user. The feature can be deactivated on the computing device at the time the details are output. The computing device can be programmed to present the feature in a user interface of the computing device. The computer system can be programmed to activate the feature by transmitting activation information to the computing device to cause the computing device to activate the feature. The computing device can be programed to prohibit user selection of the feature when the feature is deactivated, and the computing device can be programmed to permit user selection of the feature when the feature is activated.

Other embodiments of these aspects include corresponding apparatus and computer programs recorded on one or more computer storage devices, configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The details of one or more implementations are depicted in the associated drawings and the description thereof below. Certain implementations may provide one or more advantages. For example, the disclosed technology can minimize the aggregate damage that is caused to buildings and personal property contained therein when fire suppression systems are used to extinguish fires in buildings. For instance, by allowing a user, such as a homeowner, to have the ability to turn off a fire suppression system once a fire has been extinguished by a fire suppression system, the damage that would be caused by a fire can be minimized and the damage that would be caused from water used by the fire suppression system can be minimized. In contrast, without such technology, a fire suppression system will continue to run until a person is able to arrive at the building to physically turn off the fire suppression system, during which time extensive water damage can be incurred.

In another example, the disclosed technology can use redundancies to verify that a fire has been extinguished by a fire suppression system before allowing a user to remotely turn off the fire suppression system, which can allow for the technology to operate effectively and safely. For instance, without redundancies to determine whether a fire has been extinguished, a fire may incorrectly be detected as being extinguished and the fire suppression system may be turned off prematurely. In such a situation, the fire could reemerge and cause extensive damage to the building. By using redundancies, such as multiple different sensors and sensor systems to verify whether a fire has been extinguished, the risk of a fire reemerging after the fire suppression system has been shut off can be minimized, which can minimize both the risk of fire and water damage to the building. Additionally, the use of redundancies can improve the likelihood that the disclosed technology will be permitted for use by fire marshals and others overseeing the installation and operation of fire suppression systems, which can improve the reach and aggregate benefit of the disclosed technology.

In a further example, through the use of a central computer system to determine whether a fire has been extinguished by a fire suppression system, the disclosed technology can provide reliable, independent, and consistent determinations of when fires have been extinguished by fire suppression systems. Such centralized determinations can improve the accuracy and performance of the disclosed technology.

Other features, objects, and advantages of the technology described in this document will be apparent from the description and the drawings, and from the claims.

BRIEF DESCRIPTION OF THE DRAWINGS

Like reference symbols in the various drawings indicate like elements.

DETAILED DESCRIPTION

FIGS. 1A-E are conceptual diagrams of an example system 100 for remotely controlling a fire suppression system. The conceptual diagrams depict operation of the system 100 in response to a fire that is suppressed and extinguished by the fire suppression system, including the remote shut off of the fire suppression system.

Figure 1A:
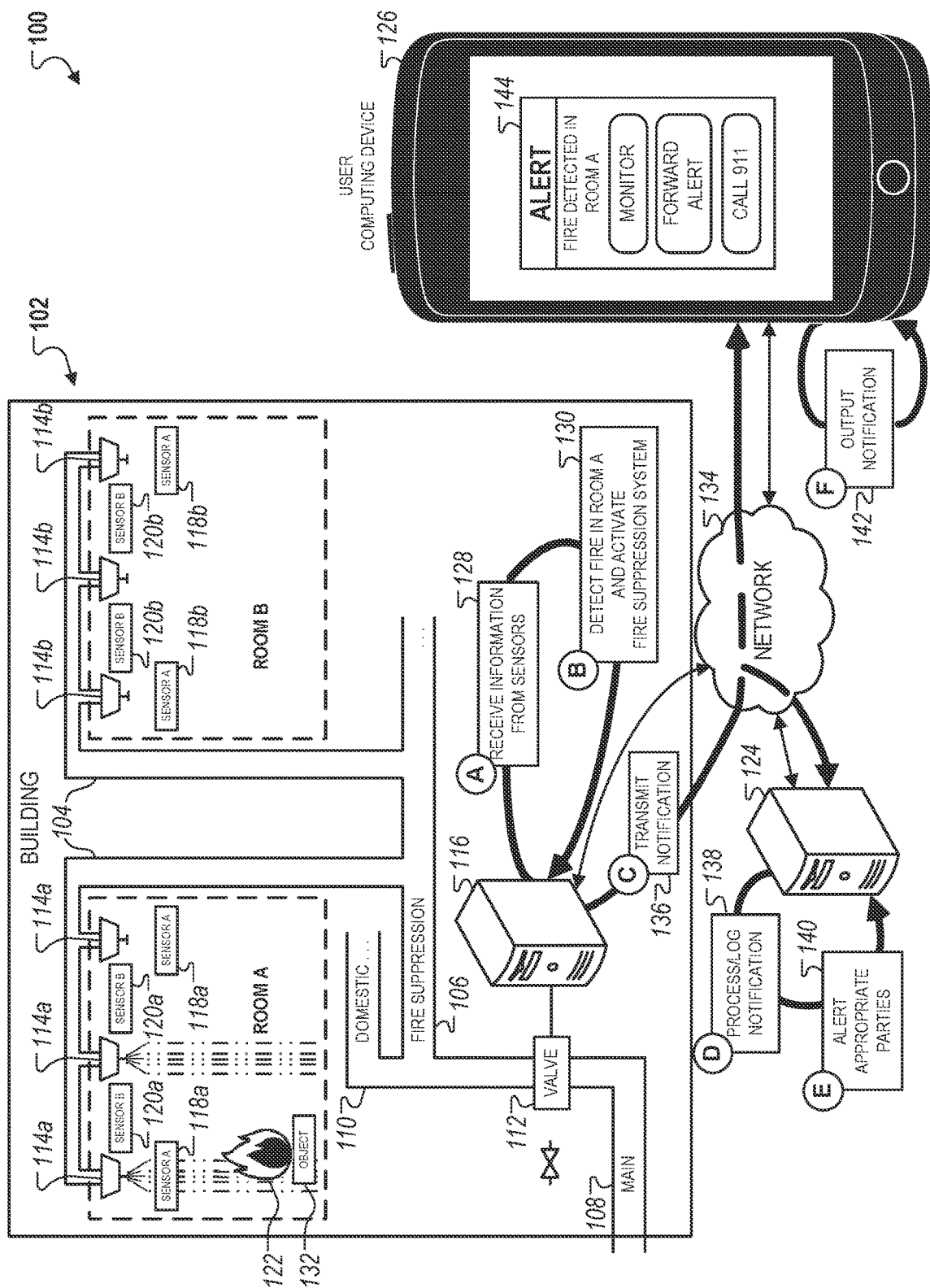
FIGS. 1A-E are conceptual diagrams of an example system for remotely controlling a fire suppression system.

Referring to FIG. 1A, the example system 100 includes an example building 102 (e.g., house, office, apartment) that has a fire suppression system 104 installed throughout the building 102, for example, in rooms A and B of the building 102. The example fire suppression system 104 that is depicted is supplied by a fire suppression water line 106 that branches off of a main water line 108 and, according to fire codes in many jurisdictions, before a domestic branch 110 of the water line. The main 108 can further includes a valve 112 that, as indicated by the symbol to the left of the valve, is open in FIG. 1A.

The fire suppression system 104 includes sprinkler heads 114a in room A of the building 102 and sprinkler heads 114b in room B of the building 102. The sprinkler heads 114a-b can be any of a variety of appropriate types of sprinkler heads, such as glass bulb sprinklers (e.g., heads that are activated by a glass bulb with heat-sensitive material that causes the bulb to break and allows a cap to fall away to release water from the sprinkler head), fusible link sprinklers (e.g., heads with a two-part heat sensitive metal alloy that holds a cap/plug in place and, in response to the alloy reaching a threshold temperature, causes the cap/plug to fall away to release water from the head), pendant sprinkler heads (e.g., heads that hang down from the ceiling), concealed pendant sprinkler heads (e.g., heads that are recessed and covered within the ceiling and drop down when activated), upright sprinkler heads (e.g., heads that project up into space), and/or side wall sprinkler heads (e.g., heads that stand out from a wall). Other types of sprinkler heads are also possible.

In response to detecting a fire or conditions that would indicate a fire, such as smoke and/or heat, one or more of the sprinkler heads 114a-b in the fire suppression system 104 can be activated and can begin extinguishing/dousing the building with water supplied to the fire suppression water line 106 from the main 108. The sprinkler heads 114a-b can include fire and/or fire condition sensitive elements that can cause the sprinkler heads 114a-b to be activated and to begin extinguishing/dousing, such as glass bulbs and heat sensitive metal alloy components. For example, the fire suppression system 104 can be a wet pipe system (the fire suppression water line 106 always being filled with water) such that, when the sprinkler heads 114a-b are individually activated by their fire sensitive elements (e.g., glass bulb bursts when threshold temperature reached), they can immediately begin extinguishing/dousing the nearby area with water. In another example, the fire suppression system 104 can be a dry pipe system (the fire suppression water line 106 containing pressurized air (or other gases) that applies pressure to a clapper blocking water from entering the fire suppression water line 106) that fills with water after a fire sensitive element of an individual sprinkler head 114a-b is activated.

The sprinkler heads 114a-b may additionally, or alternatively, be activated by other devices and/or sensors that are external from the heads 114a-b, such as smoke detectors, heat sensors, and/or other devices/sensors that may detect the presence of fire and/or fire conditions. For example, the fire suppression system 104 can be a pre-action system that requires two or more sensors/devices to detect the presence of a fire for the heads 114a-b to begin extinguishing. For instance, an example pre-action system can initially have no water in the fire suppression water line 106 and can use a valve/cap that releases water into the water line 106 in response to a smoke detector in the building 102 detecting smoke. After water is released into the water line 106, the line 106 becomes wet and the sprinkler heads 114a-b can begin extinguishing/dousing once their fire sensitive elements are individually activated (e.g., glass bulb bursting from heat reaching threshold temperature).

When activated, the sprinkler heads 114a-b can send signals to a computing device 116 (e.g., control panel, home automation computer system, computing device within the building 102 transmitting information to one or more remote computer server systems, smartphones, tablets, desktop computers) that indicate that they have been activated. For example, the sprinkler heads 114a-b can be part of a low voltage system and can be supplied by power over one or more low voltage lines. Through the use of the low voltage system, wired and/or wireless signals indicating that the sprinkler heads 114a-b have been activated can be sent to the computing device 116. For example, activation of the sprinkler heads 114a-b can cause one or more circuits of the low voltage system to be completed, which can be detected by the computing device 116 (or other devices in communication with the computing device 116). In another example, the sprinkler heads 114a-b can include wireless transmitters that, when activated, transmit one or more wireless signals to the computing device 116 that indicate that they have been activated.

Remote control of the fire suppression system 104 can include the use of sensors that are located throughout the building 102, such as a first type of sensors (sensors A 118a-b) and a second type of sensors (sensors B 120a-b) that are positioned in rooms A and B. The sensors 118-120 can sensors that are capable of sensing fires and/or conditions (e.g., smoke, heat) that indicate the presence of fires, such as smoke detector devices, heat detector devices (e.g., thermometers), imaging devices that are capable visually detecting fire/heat across one or more portions of the light spectrum (e.g., thermographic camera detecting the infrared (IR) light spectrum, thermal imaging camera), and/or flame detector devices (e.g., devices that detect fires by analyzing and/or comparing one or more portions of the ultraviolet (UV) and IR spectrums). The sensors A 118a-b and B 120 a-b can be different types. For example, the sensors A 118a-b can be heat detectors and the sensors B 120a-b can be imaging devices to visibly detect fire/heat.

Like the sprinkler heads 114a-b, the sensors 118-120 can transmit signals indicating the current state within the rooms A and B to the computing device 116. For example, the sensors 118-120 can be part of the same or different low voltage system as the sprinkler heads 114a-b and can transmit signals through one or more wired and/or wireless connections to the computing device 116. These signals can be used to verify whether there is a fire within the rooms A and B, and when such a fire has been sufficiently extinguished to permit the water supply for the fire suppression line 106 to be turned off.

FIGS. 1A-E depict an example scenario of a fire 122 being detected and extinguished in room A by the fire suppression system 104, and the remote control of the fire suppression system 104 through the use of a remote computer system 124 (e.g., one or more computer servers, cloud computing system, desktop computer) and a user computing device 126 (e.g., mobile computing device (e.g., smartphone, personal digital assistant (PDA), tablet computing device), laptop, desktop computer). At a high level, the remote computer system 124 can receive information from the computing device 116 regarding the state of the fire 122, as detected by the sensors 118-120, and the fire suppression system 104. The remote computer system 124 can provide the user computing device 126 with alerts and real-time (or near real-time) information as to what is going on in the building 102 with regard to the fire 122, and can only provide the user computing device 126 with the option to turn off water supply to the fire suppression system 104 once the remote computer system 124 has sufficiently verified, based on the information provided by the sensors 118-120, that the fire 122 has been extinguished.

Referring to FIG. 1A, the computing device 116 can receive information from the sprinkler heads 114a-b and the sensors 118-120, as indicated by step A (128). The computing device 116 can detect that one or more of the heads 114a-b of the fire suppression system 104 have been activated and, from the sensor 118-120, that there is a fire 122 in room A, as indicated by step B (130). For example, an example object 124 (e.g., couch, carpet) in room A is on fire, which causes two of the sprinkler heads 114a in room A to be activated and to begin extinguishing the fire 122 with water. Being part of a low voltage system, the sprinkler heads 114a activate a water flow switch that can transmit water flow information via a signal to the computing device 116, which may indicate that said sprinkler heads 114a have been activated. The sensors 118a and 120a can also transmit information to the computer system 116 regarding the fire 122, such as temperature information, smoke information, and/or thermal images of the room A, the object 132, and the fire 122.

In response to detecting the fire 122 and activation of the fire suppression system 104, the computing device 116 can transmit a notification to the remote computer system 124 over a communication network 134, as indicated by step C (136). The communication network can be any of a variety appropriate networks over which the computing device 116, the remote computer system 124, and the user computing device 126 can communicate, such as the internet, mobile data networks (e.g., 3G/4G mobile data networks), wireless networks (e.g., Wi-Fi networks, BLUETOOTH networks), local area networks (LANs), wide area networks (WANs), virtual private networks (VPNs), fiber optic networks, cellular networks, and/or any combination thereof.

As indicated by step D (138), the computer system 124 can process and log the notification received from the computing device 116. For example, the computer system 124 can determine that there is a fire in the building 102 and can retrieve contact information (e.g., username, identifier for user computing device 126 (e.g., telephone number)) for the users associated with the building 102 (e.g., owners, landlords, tenants, emergency response system for the jurisdiction within which the building 102 is situated) for alerting the users. As indicated by step E (140), the computer system 124 can alert the appropriate parties, such as the owners of the building 102 and fire department in the jurisdiction where the building 102 is located. For example, an alert can be transmitted over the network 134 to the user computing device 126.

As indicated by step F (142), the user computing device 126 can receive the alert (e.g., push notification, email, text message) and can output the notification on the device 126. An example alert 144 is depicted as being displayed by the device 126. The alert 144 includes a notice that a fire has been detected in Room A of the building 102, and provides the user with selectable options to remotely monitor the fire from the device 126, to forward the alert 144 to another user and/or device, and to contact (e.g., place a phone call) to emergency services, such as 911.

Figure 1B:
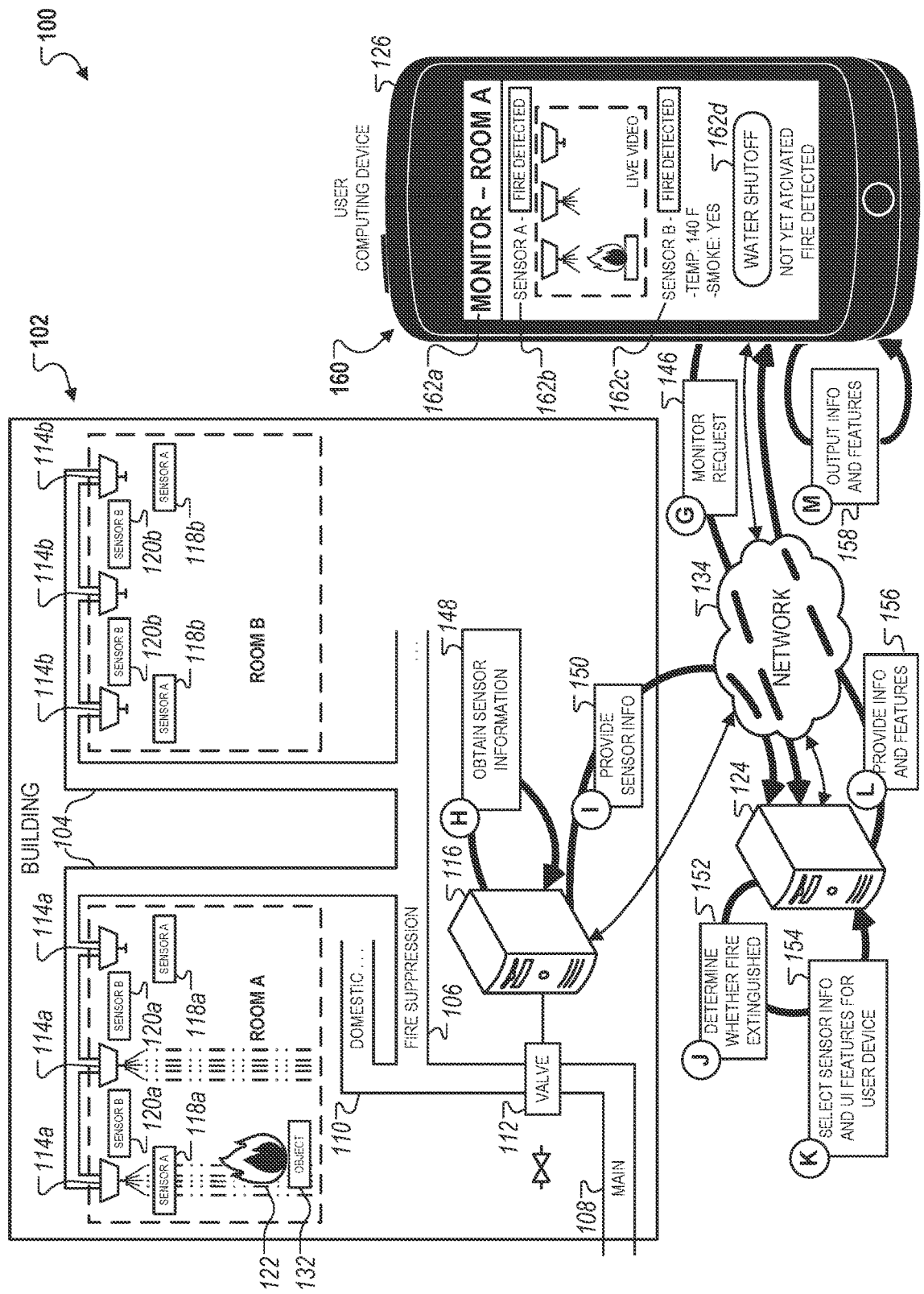

Referring to FIG. 1B, in response to the user of the device 126 selecting the monitor option, the user computing device 126 can transmit a request to computer system 124 to monitor the fire, as indicated by step G (146). Before and around this same time, the computing device 116 can continue to obtain sensor information from the sensors 118-120, as indicated by step H (148), and to provide the sensor information to the computer system 124, as indicated by step I (150). The computer system 124 can receive the continual stream of sensor information from the computing device 116 and can use it to determine the state of the fire, including whether the fire has been extinguished, as indicated by step J (152). In response to the request from the user device 126 to monitor the fire and based on the determined state of the fire, the computer system 124 can select sensor information and user interface (UI) features to provide to the user device 126 for monitoring the fire, as indicated by step K (154).

For example, the computer system 124 can be programmed to only provide the user computing device 126 with the option to remotely shut off the water supply to the fire suppression system 104 once the fire 122 has been verified, through one or more of the sensor systems 118 and 120, to have been extinguished. In the example depicted in FIG. 1B, the fire 122 on the object 132 has not yet been extinguished, so the computer system 124 may not provide the user computing device 126 with the option to turn off the fire suppression system 104.

The computer system 124 can provide the selected information and UI features to the user computing device 126, as indicated by step L (156), which can be output by the user computing device 126, as indicated by step M (158). An example user interface 160 is depicted as including a variety of information 162a-d regarding the fire 122.

For example, a first portion of information 162a identifies the information 162b-d as pertaining to monitoring of room A in the building 102. The second portion of information 162b provides the current status of the fire 122 as detected by the sensors A 118a that are located in room A, which in this example are image-based sensors (e.g., IR imaging devices, visible light cameras). The information 162b provides a real-time (or near real-time) image/video of the room A and also status information for the fire 122 ("fire detected") from those sensors 118a, as determined by the computing device 116 and/or the computer system 124 based on the information from the sensors 118a. The third portion of information 162c provides the current status of the fire 122 as detected by the sensors B 118b that are located in room A, which in this example are combination smoke and heat sensors. Current temperature and smoke information for room A are provided and updated in real-time (or near real-time), and a status of the fire 122 is provided, as determined by the computing device 116 and/or the computer system 124. A fourth portion of information 162d includes a deactivated user interface feature (e.g., button, slider) that, once activated, can allow the user of the device 126 to shut off the water supply to the fire suppression system 104.

Figure 1C:
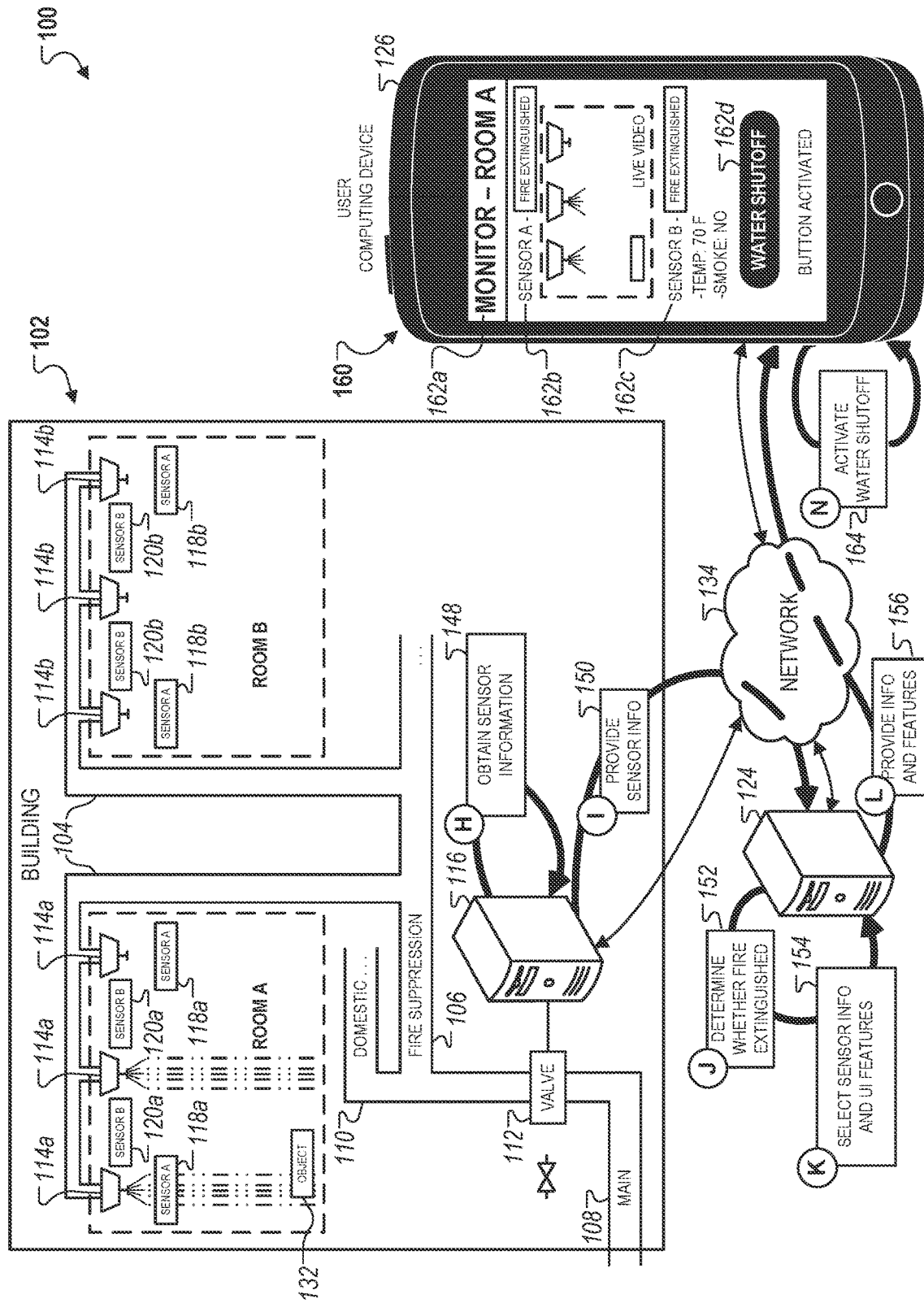

Referring to FIG. 1C, the fire 122 in room A has now been extinguished by the fire suppression system 104. However, even though the two sprinklers 114a that were activated have extinguished the fire 112, they are still extinguishing/dousing room A of the building 102, as depicted in FIG. 1C. As described above, many types of the sprinklers 114a-b will continue to extinguish/douse once activated (e.g., cap/plug released by glass bulb breaking or metal alloys reaching threshold temperature), will not shut off on their own, and will continue to so long as water being supplied the fire suppression water line 106. To stop the activated sprinklers 114a from extinguishing/dousing room A, the water supply to the fire suppression water line 106 may need to be shut off so that the activated sprinkler heads 114a can be replaced/repaired (e.g., replaced with heads having unbroken glass bulbs holding caps/plugs in place). Under many building codes to ensure that the fire suppression system 104 is not selectively disabled, the fire suppression water line 106 branches off of the main line 108 with the domestic water line 110 and does not have a separate or independent shut off valve. In such situations, to turn off the water supply to the water supply line 106, the valve 112 for the main water line 108 to the building 102 will have to be shut off.

During the period of time when the fire 122 has been extinguished and the sprinklers 114a are still extinguishing/dousing room A, as depicted in FIG. 1C, additional and unnecessary water damage may be caused to room A as well as to other parts of the building 102. To minimize this additional damage to the building 102, the computing device 116 and the computer system 124 can allow for remote control of the water supply for the fire suppression line 106 (e.g., the main line 108 and the valve 112) to be controlled and turned off from the user computing device 126 once the fire 122 has been verified to be extinguished. As depicted in FIG. 1C, the computing device 116 can continue to obtain sensor information (step H, 148) and to provide the sensor information to the computer system (step I, 150). The computer system 124 can also continue to determine whether the fire has been extinguished (step J, 152) and to select appropriate information and UI features to present to a user on the user device 126 (step K, 154).

When performing step J (determining whether the fire has been extinguished), the computer system 124 can examine a variety of factors to hedge against the risk of the fire suppression system 104 being turned off prematurely (before the fire 122 has been fully extinguished, which would allow for it to reemerge in room A or other parts of the building 102). For example, the determination made by the computer system 124 the as to whether the fire 122 has been extinguished can be based on whether each of the sensor systems (e.g., sensors A 118a-b and sensors B 120a-b) has provided information that indicates that the fire or fire conditions have ceased for at least a threshold period of time (e.g., 5 seconds, 15 seconds, 30 seconds, 1 minute, 2 minutes, 3 minutes, 5 minutes). Disagreement among information provided by the sensors systems as to the state of the fire 122 can indicate that the fire still exists, that it may reemerge if the extinguishing/dousing does not continue, and that the fire suppression system 104 should not yet be shut off. Information from each sensor system (e.g., sensors A 118a-b and sensors B 120a-b) can be compared against thresholds that indicate whether the sensors are detecting a fire and/or conditions that indicates a fire. For instance, the thermal images provided by the example sensors A 118a can be analyzed to determine whether any portions of the images indicate heat in excess of a threshold value (e.g., 70° F., 80° F., 90° F., 100° F.), smoke information provided by the example sensors 120a can be analyzed to determine whether smoke is currently detected, and ambient temperature information for the room A provided by the sensors 120a can be compared against threshold values (e.g., 70° F., 80° F., 90° F., 100° F.). Temperature threshold values, for example, may be specified as an appropriate fixed value, or as a variable value that depends on (e.g., is 5 degrees, 10 degrees, or another suitable number of degrees greater than) an ambient air temperature (e.g., a setpoint temperature, a measured temperature) of the building 102 at a time (e.g., a half hour, an hour, two hours) before the fire activation system 104 was activated.

In the example depicted in FIG. 1C, the computer system 124 can determine whether the fire 122 has been extinguished and, based on that determination, can enable the UI feature for remotely shutting off the water supply to the fire suppression system 104 on user computing device 126. The computer system 124 can provide the updated sensor information and the UI features, including the water shut off feature, to the client computing device 126, as indicated by step L (156).

In response to receiving the information and UI features, the user computing device 126 can update the user interface 160 and can activate the water shut off button, as indicated by step N (164). For example, the information 162a-d that is presented in the user interface 160, can be updated to indicate that the current status of the fire in room A. For instance, the second portion of the information 162b is updated to depict a current image/video of the room A, which includes the fire being out, the sprinklers still extinguishing/dousing the room A, and a status determined by the computer system 124 (and/or the computing device 116) that, based on sensor A, the fire has been extinguished. The third portion of the information 162c is updated with the current temperature and smoke status for room A, as well as with the status determined by the computer system 124 (and/or the computing device 116) that, based on sensor B, the fire has been extinguished. The fourth portion of the information 162d is updated to provide the user with a selectable feature (e.g., button, slider) to shut off the water and information indicating that the feature has been activated.

Figure 1D:
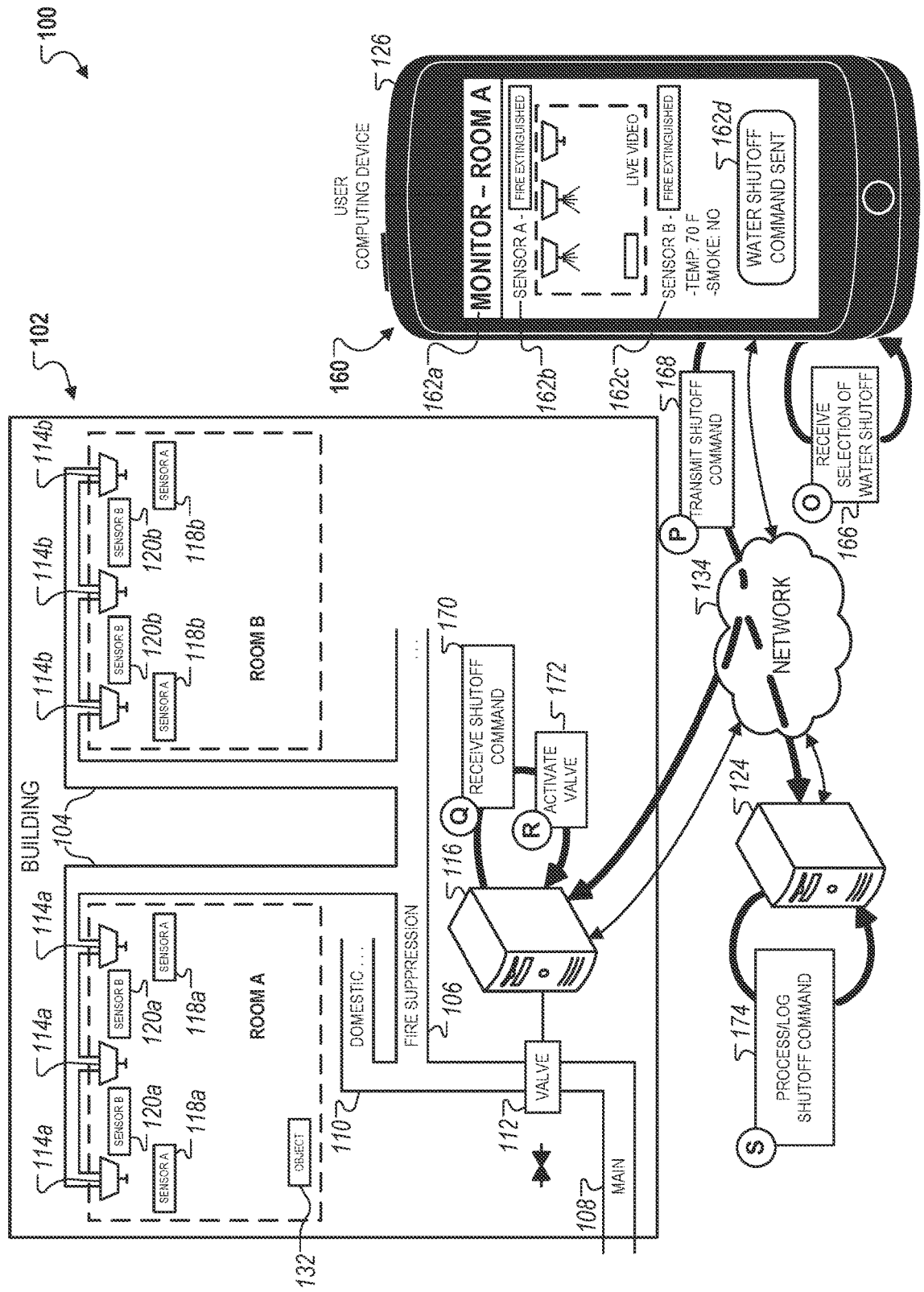

Referring to FIG. 1D, the user computing device 126 can receive selection of the water shut off feature, as indicated by step O (166), and in response can transmit a shut off command to the computer system 124 and/or to the computing device 116, as indicated by step P (168). The user interface 160 can be updated to reflect that the shut off command has been sent, as indicated in the fourth portion of the information 162*d*. In some implementations, the shut off command can be sent to the computer system 124, which can verify the command as being appropriate and/or authorized given the determined state of the fire and can retransmit the command to the computing device 116. In some implementations, the shut off command may be sent from the user computing device 126 directly to the computing device 116 in addition/alternative to the command being sent to the computer system 116.

As indicated by step Q (170), the computing device 116 can receive the shut off command and, as indicated by step R (172) and in response to receiving the command, can activate the valve 112. The computing device 116 can send a signal (e.g., wired signal, wireless signal) to one or more devices that are able to electromechanically control the valve, such as a solenoid valve. A valve control device can open and close the valve in response to the signal using electrical, hydraulic, pneumatic, or other appropriate actuators, and may include one or more sensors that monitor changes in valve condition (e.g., an open or closed state). Such a device may be part of or separate from the valve 112, and may be able to report the state of the valve to the computing device 116 (e.g., valve 112 is open, valve 112 is closed). As indicated by the symbol next to the valve 112 in FIG. 1D, the valve 112 closes and is in a closed state following direction from the computing device 116.

As indicated by step S (174), the computer system 124 can process and log the shut off command received from the user computing device 126. The computer system 124 can log some or all of the information that is received from the computing device 116 and/or the user computing device 126 in conjunction with the building 102, which can be used by any of a variety of parties at a later time, such as fire investigators, insurers, manufacturers, and/or builders.

Figure 1E:
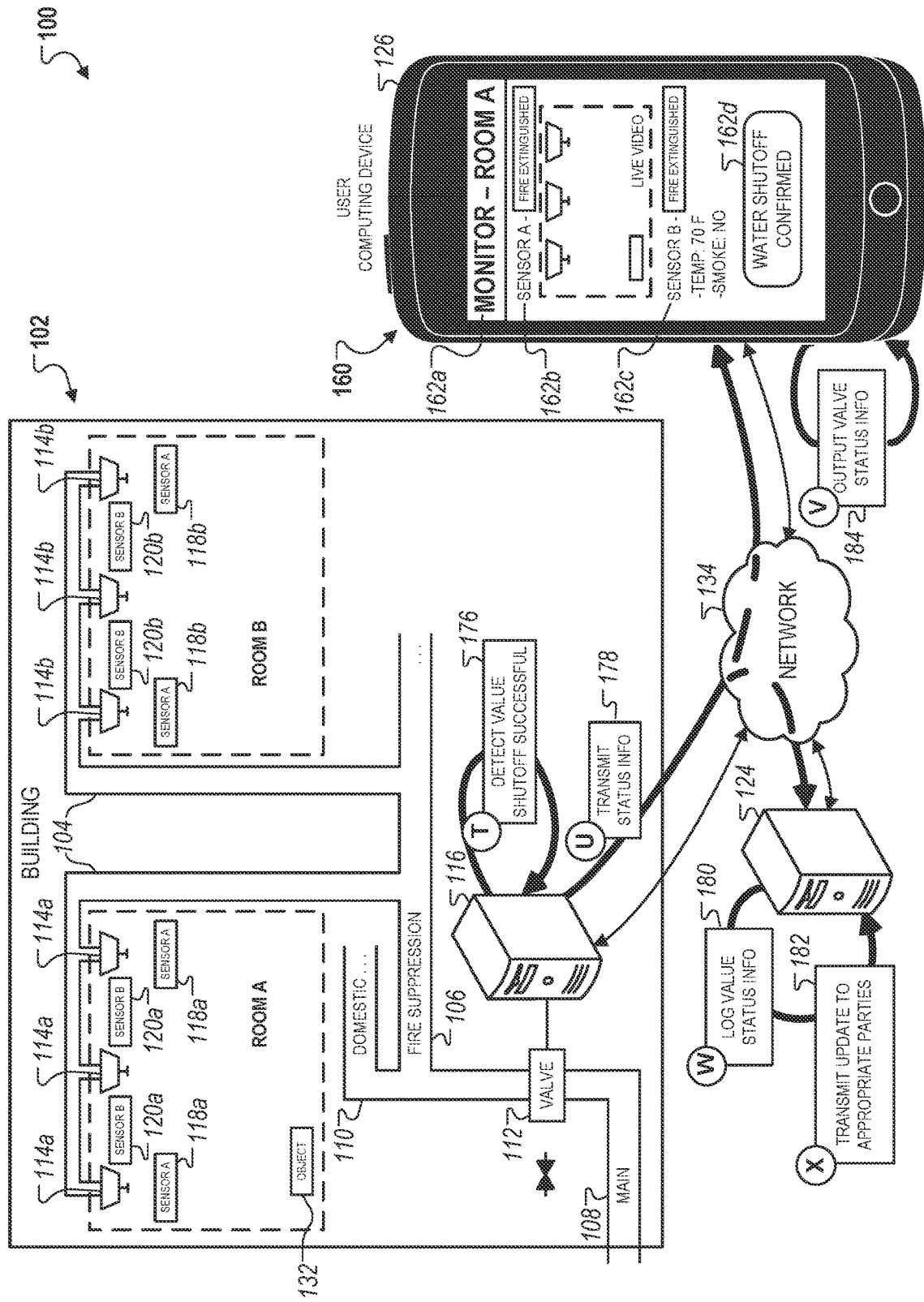

Referring to FIG. 1E, the computing device 116 can detect whether the valve 112 has been successfully shut off, as indicated by step T (176). For example, the computing device 116 can receive information from the valve 112 and/or electromechanical device used to shut off the valve 112 indicating the state of the valve 112. The computing device 116 may additionally and/or alternatively obtain water flow information from one or more flow meters that are installed along the water supply after the valve 112, such as a flow switch that is installed on the fire suppression line 106.

The computing device 116 can transmit information about the status of the valve to the computer system 124, as indicated by step U (178). The computer system 124 can receive and log the status information regarding the valve, as indicated by step W (180), and can transmit an update regarding the status to the appropriate parties (e.g., user computing device, fire department, emergency response services, insurer), as indicated by step X (182).

The user computing device 126 can receive the update and can output the valve status information, as indicated by step V (184). For example, the fourth portion of the information 162*d* can be updated to indicate that the water shut off has been confirmed by the computing device 116 and/or the computer system 124.

A variety of additional and/or alternative features can be used in association with the system 100. For example, the computing device 116 and/or the computer system 124 can be programmed to automatically transmit a shut off command without user involvement. Such an automated shut-off command may be generated based on a variety of factors, such as whether the user computing device 126 is active and monitoring the fire 122, the estimated time for the fire department to arrive at the building 102, the confidence with which the fire 122 has been determined to be extinguished based on the information from the sensors 118-120, and/or an amount of time that has elapsed since the fire 122 was determined to be extinguished and/or that the shut off command was made available without being activated. Such factors may be designated by any of a variety of appropriate parties, such as the owners of the building 102, the tenants of the building 102, fire officials (e.g., fire marshals), and/or insurers of the building 102.

In another example, the user of the user computing device 126 who is able to shut off the fire suppression system can include one or more parties, such as the building owner, tenants of the building 102, private and/or public emergency response groups (e.g., home security company, fire department), fire officials (e.g., fire marshal), and/or other proxies who may be designated. In some implementations, there may need to be consent from multiple parties for the fire suppression system to be shut off. For instance, there may be another user computing device, such as one associated with a fire department and/or fire marshal, that has the same view of the building 102 and the fire 122, and which also has to consent to the water being shut off for the computer system 124 and/or the computing device 116 to act upon the command.

In another example, the computing device 116 and the other low voltage components of the system 100 can be supplied with power from one or more backup power supplies, as needed. For example, the building 102 can have a battery backup that can be used to power the computing device 116, the sensors 118-120, and/or the electromechanical control of the valve 112.

Figure 2:
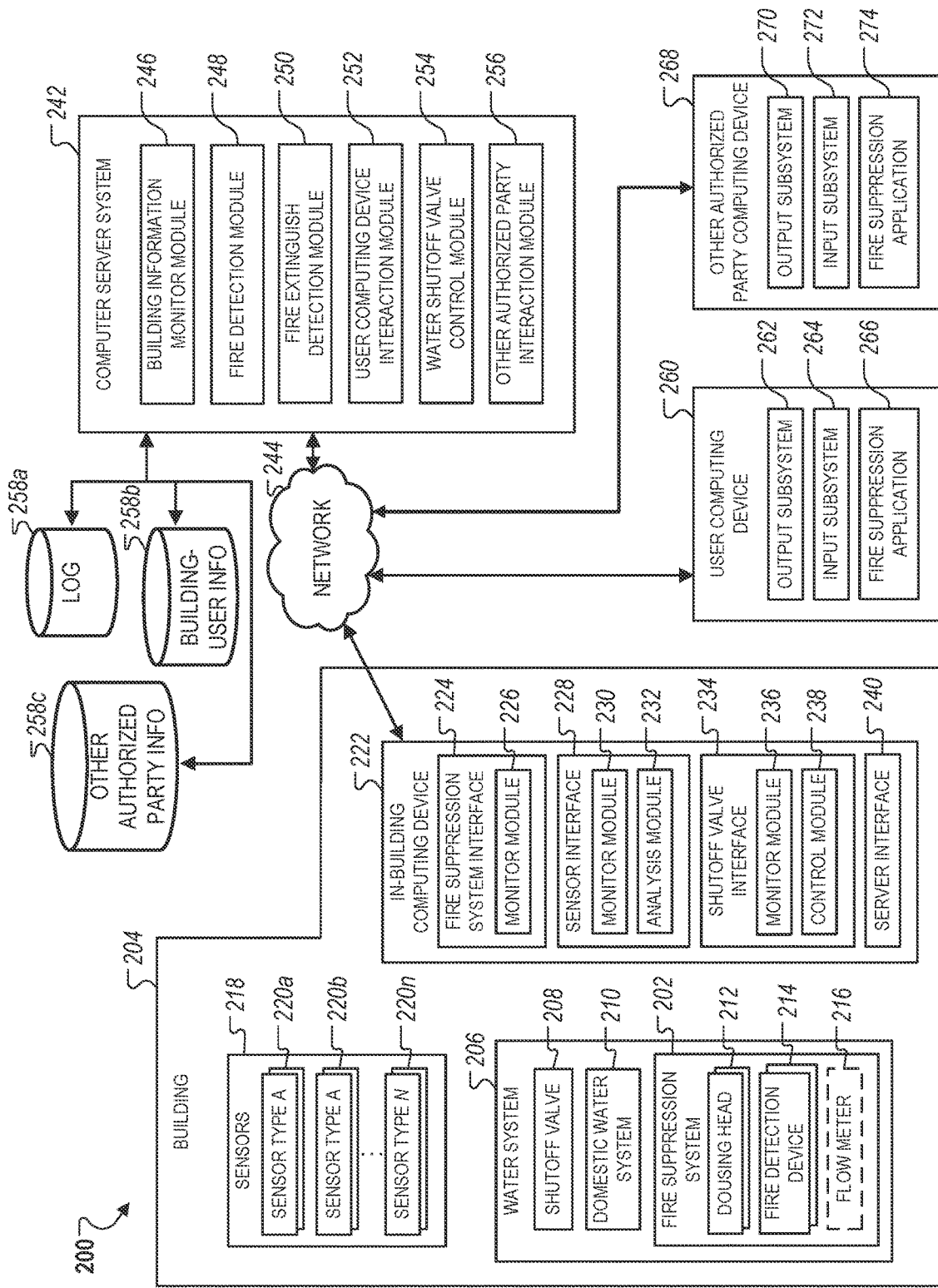
FIG. 2 depicts a system for remotely controlling a fire suppression system.

FIG. 2 depicts a system 200 for remotely controlling a fire suppression system 202. The system 200 can be similar to the system 100, described above with regard to FIG. 1.

The system 200 includes a building 204 (e.g., the building 102) that includes a water system 206 with a shut off valve 208 (e.g., the valve 112), a domestic water system 210 (e.g., the domestic water line 110), and the fire suppression system 202 (e.g., the fire suppression system 104 with fire suppression line 106). The fire suppression system 202 can include a plurality of extinguishing/dousing heads 212, such as the sprinkler heads 114*a-b* described above with regard to FIG. 1. The fire suppression system 202 further includes a plurality of fire detection devices 214 that can detect a fire and/or the presence of conditions that indicate that is a fire, and that can trigger, either directly or indirectly, the activation of the extinguishing/dousing heads 212. For example, the fire detection devices 214 can be glass bulbs that are positioned within the extinguishing/dousing heads 212 and that burst when a threshold temperature is reached, thus releasing a cap/plug in the extinguishing/dousing heads 212 and allowing water out of the heads 212. The fire detection devices 214 can also be other devices, such as the metal alloy discussed above and/or appropriate sensors. In some implementations, the fire suppression system 202 can further include a flow switch 216 to provide water flow information to the computing device 116, wherein said water flow information can be analyzed to determine whether water is flowing through and out of the fire suppression system 202.

The building 204 can also include sensors 218, including sensors of multiple different types 220a-n. The sensors 218 can be positioned throughout the building 204 and near/around the extinguishing/dousing heads 212 so that information regarding state of fires that may be extinguished/doused by the heads 212 is accurately obtained and reported. The sensors can be similar to the sensors 118-120 described above with regard to FIGS. 1A-E.

The building 204 can further include an in-building computing device 222, which can be similar to the computing device 116. The computing device 222 can be any of a variety of appropriate computing devices and/or systems, such as computer servers, desktop computers, laptop computers, mobile computing devices, cloud computing systems, and/or other appropriate computing devices/systems.

The computing device 222 includes a fire suppression system interface 224 that is programmed to receive information from the fire suppression system 202, such as signals transmitted by the fire detection devices 214 indicating that a fire and/or fire conditions have been detected, and that the extinguishing/dousing heads 212 have been activated. For example, the fire suppression system 202 can include a low voltage system over which signals from the fire detection devices 214 are transmitted. The fire suppression system interface 224 can include a monitor module 226 that is programmed to continuously monitor and interpret signals from the fire suppression system 202.

The computing device 222 also includes a sensor interface 228 that is similar to the interface 224 and that is programmed to receive information from the sensors 218. The sensor interface 228 includes a monitor module 230 that is programmed to continuously monitor and interpret signals from the sensors 218. The sensor interface 228 can further include an analysis module 232 that is programmed to analyze the signals from the sensors 218 to determine various states/conditions throughout the building 204, such as whether a fire or fire conditions exist at various locations within the building 204. For example, the analysis module 232 can use various threshold values for parameters that are sensed/detected by the sensors 218 to determine states/conditions.

The computing device 222 can further include a shut off valve interface 234 that is programmed to interface with the shut off valve 208 and to control an electromechanical device that controls the shut off valve 208. The shut off valve interface 234 includes a monitor module 236 that is programmed to continuously monitor information transmitted by the electromechanical device, such as information indicating whether the shut off valve 208 is open or closed. The shut off valve interface 234 also includes a control module 238 that is programmed to control the operation of the shut off valve, such as transmitting state change signal or control signals to the electromechanical device that controls the shut off valve 208.

The computing device 222 further includes a server interface 240 that enables communication between the computing device 222 and a computer server system 242 over a network 244. For example, the server interface 240 can include one or more communication interfaces, such as the TCP/IP protocol stack, Ethernet interfaces, wireless networking interfaces, and/or mobile data networking interfaces.

The network 244 can be similar to the network 134, as described above with regard to FIGS. 1A-E, and be any of a variety of communication networks over which the computing devices and computer systems that are part of the system 200 can communicate, such as the internet, mobile data networks (e.g., 3G/4G mobile data networks), wireless networks (e.g., Wi-Fi networks, BLUETOOTH networks), local area networks (LANs), wide area networks (WANs), virtual private networks (VPNs), fiber optic networks, cellular networks, and/or any combination thereof.

The computer server system 242 can be similar to the computer system 124 that is discussed above with regard to FIGS. 1A-E. The computer server system 242 can include one or more computing devices (e.g., one or more computer server, cloud computing system, desktop computer, laptop computer) that are programmed to respond to requests from client devices, such as the in-building computing device 222, and to perform processes to allow for remote control of the fire suppression system 202, as described throughout this document.

The computer server system 242 includes a building information monitor module 246 that is programmed to receive information for buildings, such as the building 204 and other buildings not depicted, from one or more computing devices that are monitoring and transmitting such information, such as the in-building computing device 222 and other computing devices associated with other buildings. Information that is received and monitored by the module 246 can be stored in one or more data repositories 258a-c, such as a log 258a that logs building information, such as timestamped information from the sensors 218, the state of the shut off valve 208, the state of the fire suppression system 202, and commands to perform water shut off operations. The other data repositories include a building-user information repository 258b that stores information about users associated with buildings, such as contact information and computing device identifiers for owners and tenants of the building 204; and other authorized party information data repository 258c that stores information about other parties that may be authorized to received building information and alerts, such as fire departments, fire marshals, and insurers.

The computer server system 242 further includes a fire detection module 248 that is programmed to determine whether there is a fire in the building 204. The computer system 242 also includes a fire extinguishing detection module that is programmed to determine, after a fire has been detected by the fire detection module 248, when the fire has been sufficiently extinguished that it is safe to allow for remote shut off of the water system 206 and the fire suppression system 202. Such determinations made by the modules 248 and 250 can additionally be stored in the log 258a.

The computer system also includes a user computing device interaction module 252 that is programmed to coordinate and manage communication with a user computing device 260, which can be associated with a user with a connection to the building 204 (e.g., owner, tenant, landlord). The module 252 can perform operations similar to steps E, K, and X (140, 154, and 182, respectively), described above with regard to FIG. 1, and can communicate with the user computing device 260 over the network 244. For example, the module 252 can determine when it is appropriate to provide/enable UI features on the computing device 260 through which the user can remotely control the fire suppression system 202.

The user computing device 260 can be similar to the computing device 126, as described above with regard to FIGS. 1A-E. The user computing device 260 can be any of a variety of appropriate computing devices, such as computer servers, desktop computers, laptop computers, and/or mobile computing devices (e.g., smartphones (e.g., IPHONE, ANDROID smartphones), cell phones (e.g., feature phones), tablet computing devices (e.g., IPADs, ANDROID tablets), personal digital assistants (PDAs), computing devices embedded within vehicles (e.g., in-vehicle computer systems with displays and/or user interfaces built into the vehicles' consoles, vehicle mounted computing devices, golf carts with embedded computing devices), wearable computing devices (e.g., GOOGLE GLASS), laptop computers, netbook computers, and/or other appropriate mobile computing devices).

The computing device 260 includes an output subsystem 262 that can output UI features through which a user of the computing device 260 can monitor the status of the building 204 and, when appropriate, deactivate a fire suppression system 202. The output subsystem 262 can include one or more appropriate output devices through which information can be provided to a user, such as a display, speakers, haptic feedback devices (e.g., vibration device), and/or other devices that are in communication with the device 206 (e.g., wireless headset). The computing device 260 further includes an input subsystem 264 through which a user can provide input, such as a command to turn off the fire suppression system 202. The input subsystem 264 can include one or more appropriate input devices through which a user of the device 260 can provide input, such as a touchscreen, physical buttons/keys, microphones, cameras, and/or other appropriate input devices (e.g., accelerometers, gyroscopes).

The user computing device 260 further includes a fire suppression application 266 that is programmed to communicate with the server system 242 to obtain information about the building 204, to provide an interface through which the user can view information about the building 204, and through which a user can provide input, such as a command to turn off the fire suppression system 202. The application 266 can be of any of a variety of appropriate types, such as software (e.g., mobile app), hardware (e.g., application specific integrated circuit (ASIC)), and/or firmware.

Water shut off commands can be transmitted by the device 260 and provided to a water shut off valve control module 254 of the computer system 242. The module 254 can monitor the status of the shut off valve 208 and can transmit commands to the electromechanical component of the valve 208, such as commands to open the valve 208 and commands to close the valve 208. Commands that are received and/or sent by the module 254 can be stored in the log 258a.

The computer system 242 can further include an other authorized party interaction module 256, which can control the interactions with other parties who may be authorized to receive information about the building 204 and/or to control the valve 208, such as other tenants of the building 204, insurers, and/or fire professionals (e.g., fire marshals, fire departments). The module 256 can interface with one or more other authorized party computing devices 268 that are associated with such other parties.

The computing device 268 can be similar to the user computing device 260, and can include an output subsystem 270 (similar to the output subsystem 262), an input subsystem 272 (similar to the input subsystem 264), and a fire suppression application (similar to the application 266).

Figure 3A:
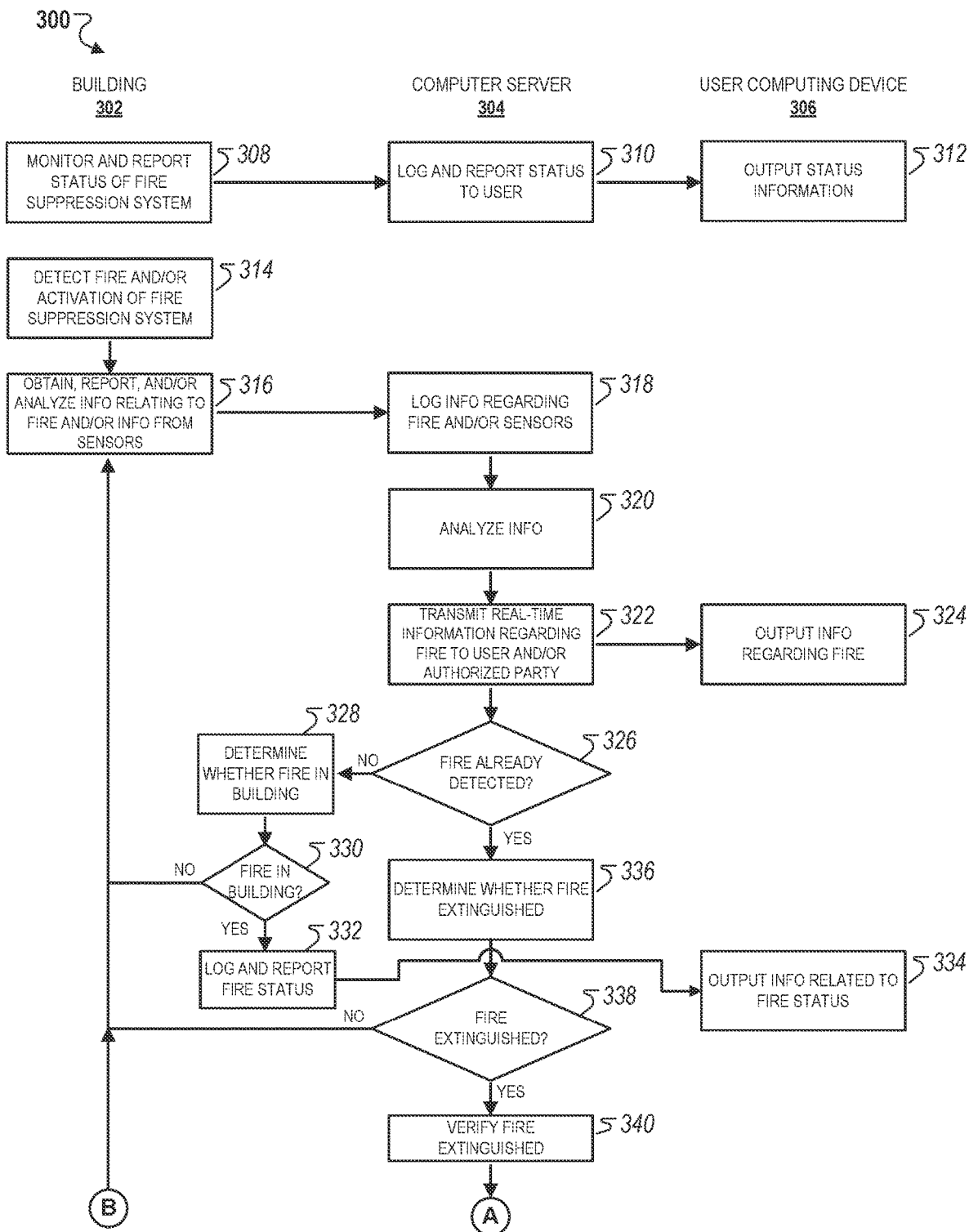
FIGS. 3A-C depict flowcharts of an example technique for remotely monitoring and controlling a fire suppression system.
Figure 3B:
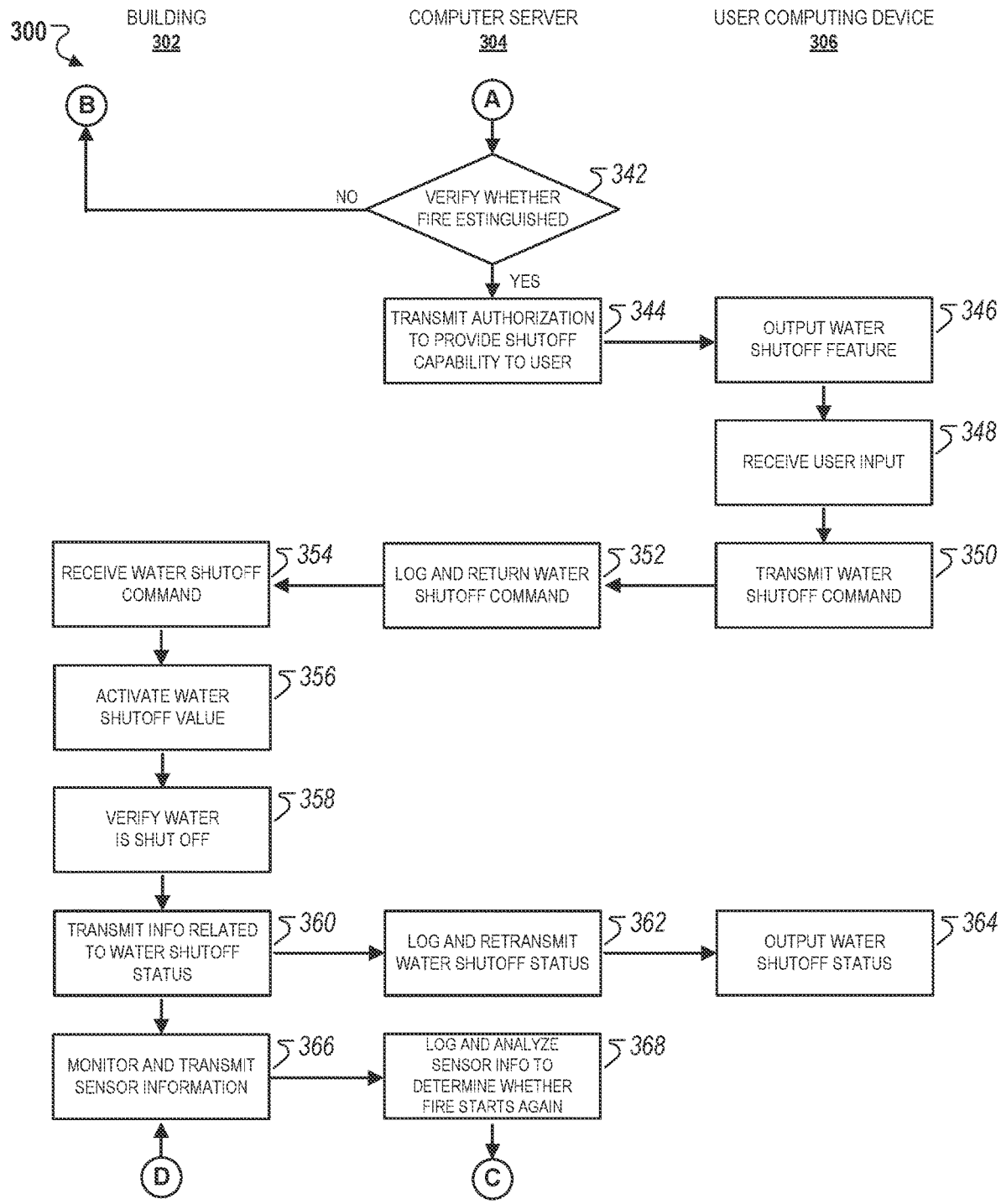
Figure 3C:
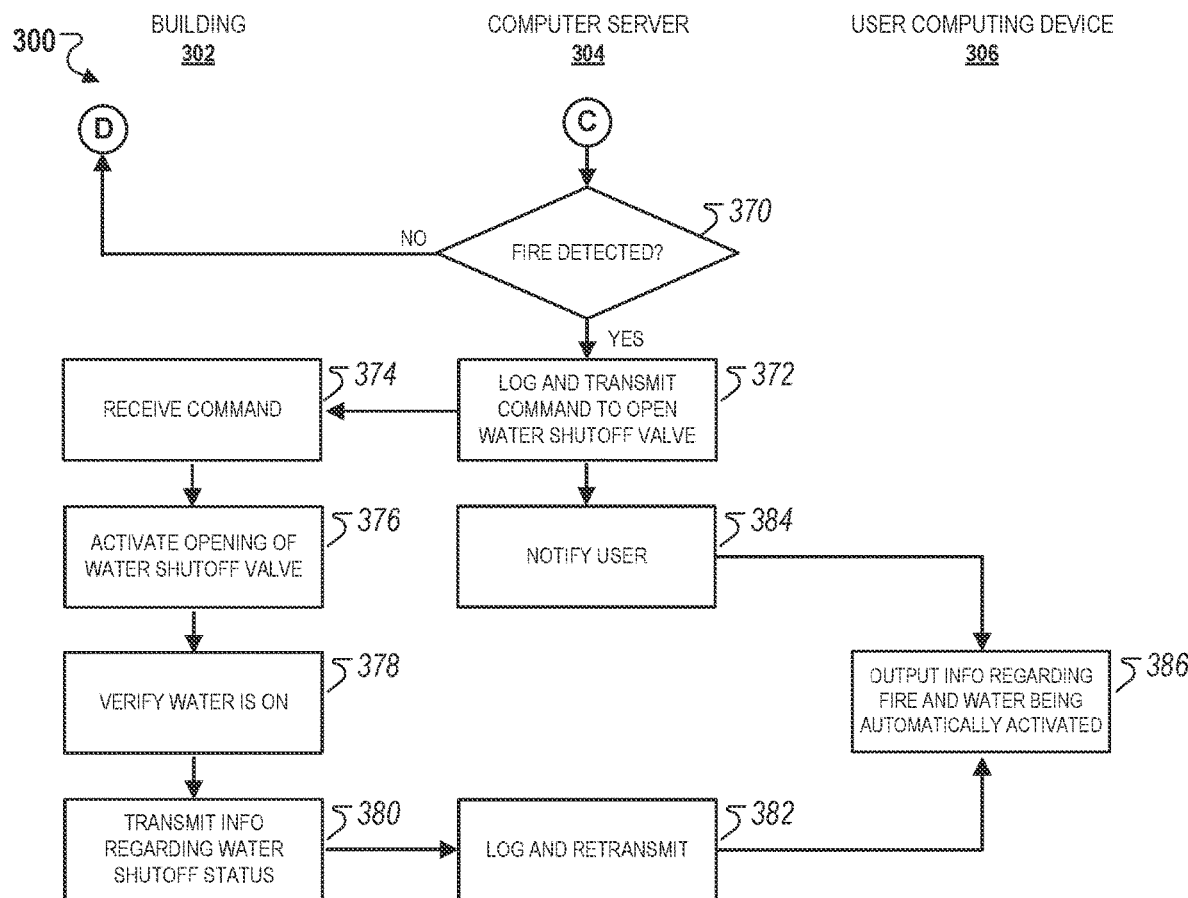

FIGS. 3A-C depict flowcharts of an example technique 300 for remotely monitoring and controlling a fire suppression system. The technique 300 is performed in part by a building computing device 302, a computer server system 304, and a user computing device 306. The building computing device 302 can be any of a variety of appropriate computing devices, such as the computing device 116, the computing device 222, and/or other appropriate computing devices. The computer server system 304 can be any of a variety of appropriate computer systems, such as the computer system 124, the computer system 242, and/or other appropriate computer systems. The user computing device 306 can be any of a variety of appropriate computer devices, such as the user computing device 126, the user computing device 260, the other authorized party computing device 268, and/or other appropriate computing devices.

The building computing device 302 can provide status information to the computer server 304 and the device 306 without there being a fire at a corresponding building. For example, the building device 302 can periodically (e.g., every minute, every 5 minutes, every 15 minutes, every 30 minutes, every hour, every 6 hours, every 12 hours) monitor and report the status of the fire suppression system to the computer sever system 304 and/or the user computing device 306 (308). The computer server system 304 can log and report to the user the status of the fire suppression system (310), which can output the status information (312).

The building computing device 302 can detect a fire (or conditions that indicate a fire) and/or activation of the fire suppression system within the building (314). In response to such a detection, the building computing device 302 can obtain, report, and/or analyze information regarding the fire and/or other information from the sensors within the building to the computer system 304 (316).

The computer server system 304 can receive and log the information regarding the fire and/or sensors (318), and can analyze the information to determine the status of the fire (e.g., location within building, extinguished, fire still active) (320). The computer server system 304 can transmit real-time information about the fire to the user and/or other authorized parties (322). The user computing device 306 can receive and output the information (324).

The computer server system 304 can determine whether fire has already been detected in the building (326) and, if it has not yet been detected, the computer server system 304 can determine whether there is a fire in the building (328). If there is determined to be a fire in the building (330), the computer system can log and report the fire status (332), which can be output on the user computing device 306 (334). If no fire has been detected, then the technique can loop back to step 316.

If a fire has already been detected, then a determination can be made as to whether the fire has been extinguished (336). If the fire is determined to not have yet been extinguished (338), then the process can loop back to step 316 and can repeatedly monitor the information from the building computer system 302 until the fire has been determined to be extinguished.

If the fire is determined to have been extinguished (338), then the computer sever system 304 can perform a verification alert that the fire is extinguished (340). Such a verification can include any of a variety of techniques, such as monitoring whether the extinguished determination for the fire remains constant for a period of time (e.g., 15 seconds, 30 seconds, 1 minute, 5 minutes) and/or whether a second or redundant set of sensors provides a consistent verification that the fire has been extinguished. Referring to FIG. 3B, if the fire is verified as having been extinguished (342), then the computer server system 304 can transmit authorization to provide shut off capability to the user or other authorized parties (344). If the fire is not verified as having been extinguished, then the technique 300 can loop back to step 316.

The user computing device 306 can receive the authorization and output the water shut off feature (346). In response to receiving user input with regard to the feature (348), the user computing device 306 can transmit a water shut off command to the computer server system 304 (350). Such a command can be received, logged, and retransmitted by the computer server system 304 (352).

The building computing device 302 can receive the water shut off command (354) and, in response to receiving the command, can activate the water shut off valve (356). The building computing device 302 can verify that the water is shut off (358) and can transmit information regarding the water shut off status to the computer server system 304 (360). The computer server system 304 can receive, log, and retransmit the water shut off status information (362), which can be output by the user computing device 302 (364).

The building computing device 302 can continue to monitor and transmit sensor information to the computer server system 304 (366), which can be logged and analyzed by the computer server system 304 to determine whether the fire has reemerged (368). Referring to FIG. 3C, the computer server system 304 can determine whether the fire has been detected again (370). If the fire has not been detected again, then the technique 300 can loop back to step 366. If the fire has been detected again, the computer server system 304 can log and automatically transmit a command to open the water shut off valve to the building computing device 302 (372). The computer server system 304 can additionally notify the user computing device 306 that the fire has reemerged and that the water is being automatically turned on (384).

The building computing device 302 can receive such a command (374), can activate opening of the water shut off valve (376), can verify that the water in the building has been turned on again (378), and can transmit information regarding the water shut off status to the computer server system 304 (380). The computer server system 304 can log and retransmit the status information (382), which can be output by the user computing device 306 (386). Once the water has been turned on again, the technique 300 can loop back to step 316.

Figure 4A:
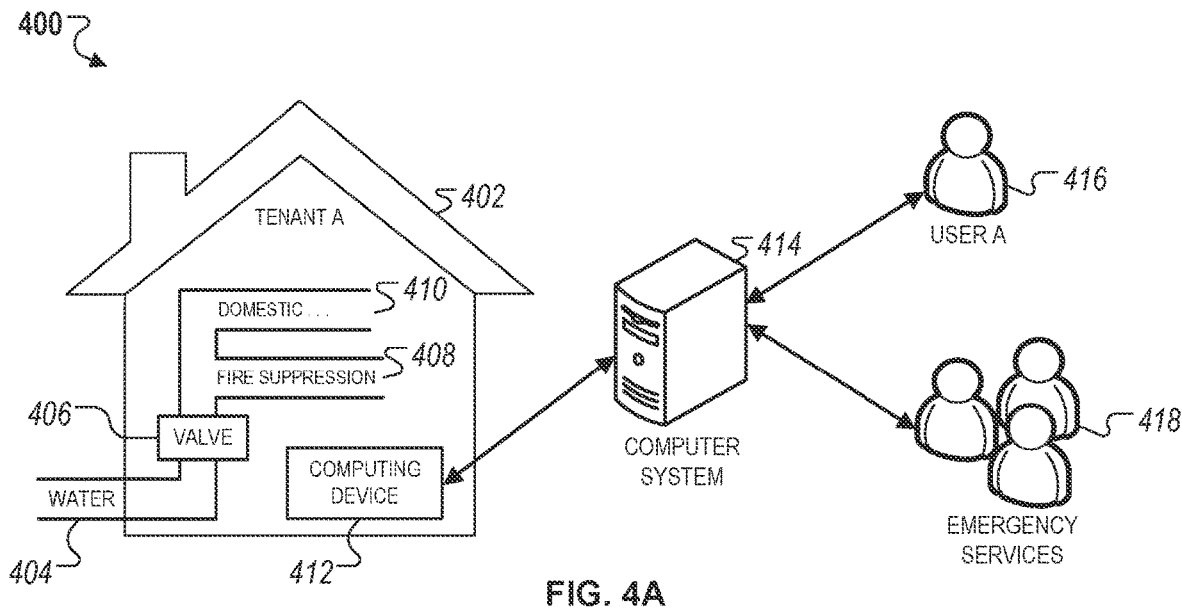
FIGS. 4A-B are conceptual diagrams of systems that include examples of other authorized parties who may receive and control water shut off valves within a building.
Figure 4B:
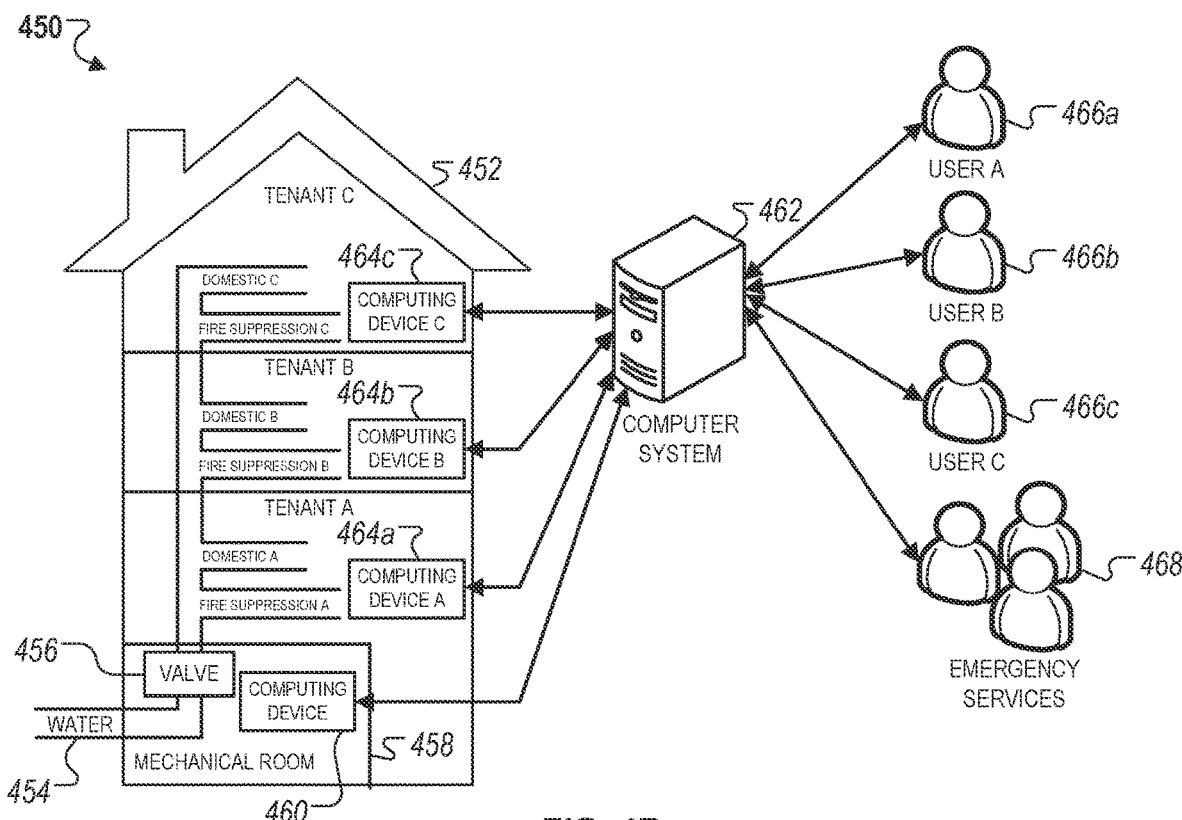

FIGS. 4A-B are conceptual diagrams of systems 400 and 450 that include example other authorized parties who may receive and control water shut off valves within a building.

Referring to FIG. 4A, the example system 400 includes a building 402 that includes one tenant/unit A that is supplied by a main water line 404 with a valve 406 that braches into a fire suppression water line 408 and a domestic water line 410. The building 402 includes a computing device 412 that can be used to transmit information about the building 402 to a computer system 414 and that can allow for remote operation of the valve 406 to shut off the water supplied to the fire suppression line 408. The computer system 414 can communicate with a computing device associated with a single user A (or group of users A, such as a family) and computing devices associated with other authorized users 418, which in this example are emergency services personnel, such as a fire department and fire marshal with jurisdiction over the building 402.

Referring to FIG. 4B, the example system 450 depicts a scenario in which a building 452 includes multiple tenants/units A-C who share a common main water line 454 that is controlled by a common valve 456. In such a situation, the fire suppression water lines A-C and domestic water lines A-C for each of the tenants/units A-C can branch off of the common main water line 454. In such a situation, the valve 456 may be located in a mechanical room/area 458 for the building 452 that can also include a computing device 460 that can communicate with a computer system 462 and can receive commands to control the valve 456. Each of the tenants/units A-C can also include computing devices A-C 464a-c that can obtain and provide information regarding components with the tenants/units A-C, such as status information from sprinkler heads and/or sensors that are located within the units A-C. The computing device A-C 464a-c can transmit such information to the computer system 462.

The computer system 462 can communicate status information for any one of the tenant/units A-C to computing devices that are associated with users for each of the units A-C, such as users A-C 466a-c. The computer system 462 can provide a tenant of a unit that has a fire to view all information about the fire and to control the valve 456 for the building, and may provide some or all of these features to the other users. For users who do not have a fire in their unit, the computer system 462 can additionally provide status information about their units, including sensor information, to the corresponding users so that they can track whether fire has spread to their unit as well. These other users may additionally be given the ability to reactivate the valve 456 to turn the water supply to the building 452 back on. The ability to reactivate the valve 456 may be restricted (similar to the water deactivation button being deactivated until a fire has been verified as being extinguished) to situations in which a fire or conditions that appear to be close to a fire are detected within one of the other units of the building 452.

Other authorized parties who may be able to access status information for the building 452 and/or control the valve 456 include, in this example, emergency services personnel 468, such as fire departments and/or fire marshals.

Computing devices and computer systems described in this document that may be used to implement the systems, techniques, machines, and/or apparatuses can operate as clients and/or servers, and can include one or more of a variety of appropriate computing devices, such as laptops, desktops, workstations, servers, blade servers, mainframes, mobile computing devices (e.g., PDAs, cellular telephones, smartphones, and/or other similar computing devices), computer storage devices (e.g., Universal Serial Bus (USB) flash drives, RFID storage devices, solid state hard drives, hard-disc storage devices), and/or other similar computing devices. For example, USB flash drives may store operating systems and other applications, and can include input/output components, such as wireless transmitters and/or USB connectors that may be inserted into a USB port of another computing device.

Such computing devices may include one or more of the following components: processors, memory (e.g., random access memory (RAM) and/or other forms of volatile memory), storage devices (e.g., solid-state hard drive, hard disc drive, and/or other forms of non-volatile memory), high-speed interfaces connecting various components to each other (e.g., connecting one or more processors to memory and/or to high-speed expansion ports), and/or low speed interfaces connecting various components to each other (e.g., connecting one or more processors to a low speed bus and/or storage devices). Such components can be interconnected using various busses, and may be mounted across one or more motherboards that are communicatively connected to each other, or in other appropriate manners. In some implementations, computing devices can include pluralities of the components listed above, including a plurality of processors, a plurality of memories, a plurality of types of memories, a plurality of storage devices, and/or a plurality of buses. A plurality of computing devices can be connected to each other and can coordinate at least a portion of their computing resources to perform one or more operations, such as providing a multi-processor computer system, a computer server system, and/or a cloud-based computer system.

Processors can process instructions for execution within computing devices, including instructions stored in memory and/or on storage devices. Such processing of instructions can cause various operations to be performed, including causing visual, audible, and/or haptic information to be output by one or more input/output devices, such as a display that is configured to output graphical information, such as a graphical user interface (GUI). Processors can be implemented as a chipset of chips that include separate and/or multiple analog and digital processors. Processors may be implemented using any of a number of architectures, such as a CISC (Complex Instruction Set Computers) processor architecture, a RISC (Reduced Instruction Set Computer) processor architecture, and/or a MISC (Minimal Instruction Set Computer) processor architecture. Processors may provide, for example, coordination of other components computing devices, such as control of user interfaces, applications that are run by the devices, and wireless communication by the devices.

Memory can store information within computing devices, including instructions to be executed by one or more processors. Memory can include a volatile memory unit or units, such as synchronous RAM (e.g., double data rate synchronous dynamic random access memory (DDR SDRAM), DDR2 SDRAM, DDR3 SDRAM, DDR4 SDRAM), asynchronous RAM (e.g., fast page mode dynamic RAM (FPM DRAM), extended data out DRAM (EDO DRAM)), graphics RAM (e.g., graphics DDR4 (GDDR4), GDDR5). In some implementations, memory can include a non-volatile memory unit or units (e.g., flash memory). Memory can also be another form of computer-readable medium, such as magnetic and/or optical disks.

Storage devices can be capable of providing mass storage for computing devices and can include a computer-readable medium, such as a floppy disk device, a hard disk device, an optical disk device, a Microdrive, or a tape device, a flash memory or other similar solid state memory device, or an array of devices, including devices in a storage area network or other configurations. Computer program products can be tangibly embodied in an information carrier, such as memory, storage devices, cache memory within a processor, and/or other appropriate computer-readable medium. Computer program products may also contain instructions that, when executed by one or more computing devices, perform one or more methods or techniques, such as those described above.

High speed controllers can manage bandwidth-intensive operations for computing devices, while the low speed controllers can manage lower bandwidth-intensive operations. Such allocation of functions is exemplary only. In some implementations, a high-speed controller is coupled to memory, display 616 (e.g., through a graphics processor or accelerator), and to high-speed expansion ports, which may accept various expansion cards; and a low-speed controller is coupled to one or more storage devices and low-speed expansion ports, which may include various communication ports (e.g., USB, Bluetooth, Ethernet, wireless Ethernet) that may be coupled to one or more input/output devices, such as keyboards, pointing devices (e.g., mouse, touchpad, track ball), printers, scanners, copiers, digital cameras, microphones, displays, haptic devices, and/or networking devices such as switches and/or routers (e.g., through a network adapter).

Displays may include any of a variety of appropriate display devices, such as TFT (Thin-Film-Transistor Liquid Crystal Display) displays, OLED (Organic Light Emitting Diode) displays, touchscreen devices, presence sensing display devices, and/or other appropriate display technology. Displays can be coupled to appropriate circuitry for driving the displays to output graphical and other information to a user.

Expansion memory may also be provided and connected to computing devices through one or more expansion interfaces, which may include, for example, a SIMM (Single In Line Memory Module) card interfaces. Such expansion memory may provide extra storage space for computing devices and/or may store applications or other information that is accessible by computing devices. For example, expansion memory may include instructions to carry out and/or supplement the techniques described above, and/or may include secure information (e.g., expansion memory may include a security module and may be programmed with instructions that permit secure use on a computing device).

Computing devices may communicate wirelessly through one or more communication interfaces, which may include digital signal processing circuitry when appropriate. Communication interfaces may provide for communications under various modes or protocols, such as GSM voice calls, messaging protocols (e.g., SMS, EMS, or MMS messaging), CDMA, TDMA, PDC, WCDMA, CDMA2000, GPRS, 4G protocols (e.g., 4G LTE), and/or other appropriate protocols. Such communication may occur, for example, through one or more radio-frequency transceivers. In addition, short-range communication may occur, such as using a Bluetooth, Wi-Fi, or other such transceivers. In addition, a GPS (Global Positioning System) receiver module may provide additional navigation and location-related wireless data to computing devices, which may be used as appropriate by applications running on computing devices.

Computing devices may also communicate audibly using one or more audio codecs, which may receive spoken information from a user and convert it to usable digital information. Such audio codecs may additionally generate audible sound for a user, such as through one or more speakers that are part of or connected to a computing device. Such sound may include sound from voice telephone calls, may include recorded sound (e.g., voice messages, music files, etc.), and may also include sound generated by applications operating on computing devices.

Various implementations of the systems, devices, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., LCD display screen, LED display screen) for displaying information to users, a keyboard, and a pointing device (e.g., a mouse, a trackball, touchscreen) by which the user can provide input to the computer. Other kinds of devices can be used to provide for interaction with a user as well; for example, feedback provided to the user can be any form of sensory feedback (e.g., visual feedback, auditory feedback, and/or tactile feedback); and input from the user can be received in any form, including acoustic, speech, and/or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The above description provides examples of some implementations. Other implementations that are not explicitly described above are also possible, such as implementations based on modifications and/or variations of the features described above. For example, the techniques described above may be implemented in different orders, with the inclusion of one or more additional steps, and/or with the exclusion of one or more of the identified steps. Additionally, the steps and techniques described above as being performed by some computing devices and/or systems may alternatively, or additionally, be performed by other computing devices and/or systems that are described above or other computing devices and/or systems that are not explicitly described. Similarly, the systems, devices, and apparatuses may include one or more additional features, may exclude one or more of the identified features, and/or include the identified features combined in a different way than presented above. Features that are described as singular may be implemented as a plurality of such features. Likewise, features that are described as a plurality may be implemented as singular instances of such features. The drawings are intended to be illustrative and may not precisely depict some implementations. Variations in sizing, placement, shapes, angles, and/or the positioning of features relative to each other are possible.

What is claimed is:

1. A system for monitoring a water supply, the system comprising:
    a solenoid valve;
    a sensor configured to generate sensor information;
    a flow meter configured to generate water flow information, and wherein the water flow information includes the water flow rate;
    a computer system, wherein the computer system is configured to:
        receive both sensor information generated by the one sensor, and water flow information generated by the flow meter;
        analyze the water flow information to determine if the water flow rate is greater than a pre-determined value;
        send a state change signal to the solenoid valve if the water flow rate is greater than the pre-determined value, and wherein said state change signal is configured to change a state of the solenoid valve; and
        if the state change signal was sent to the solenoid valve, selectively transmit user information to a user computing device over a communication network, and wherein said user information includes: (i) a notification of the state change signal, and (ii) a portion of the water flow information, (iii) a portion of the sensor information; and
    a mobile user computing device configured to display the user information transmitted by the computer system.

2. The system of claim 1, wherein the sensor is a temperature sensor and the sensor information includes an ambient temperature.

3. The system of claim 1, wherein when said user interface feature is activated by a user, the mobile user computing device transmits a signal to the computer system to turn off the water supply.

4. The system of claim 3, wherein the computer system is configured to send the state change signal to the solenoid valve once said computer system receives the signal from the mobile user computing device.

5. The system of claim 1, wherein a building has a main water line with a first extent and a second extent, and wherein said solenoid valve is configured to be positioned between the first and second extents of the main water line.

6. The system of claim 1, wherein the computer system is further configured to generate a log of building information, and wherein said log of building information includes at least one of the received sensor information or the received flow information.

7. The system of claim 6, wherein said log of building information can be displayed on at least one of the mobile user computing device or a third party computing device.

8. The system of claim 7, wherein the third party computing device is a device controlled by an insurer of a property where the system for monitoring a water supply is installed within.

9. The system of claim 6, wherein said log of building information further includes: (i) timestamped sensor information, (ii) the state of the solenoid valve, and (iii) the state change signals that are configured to change the state of the solenoid valve.

10. The system of claim 3, wherein the user interface feature is displayed once the water flow rate is greater than the pre-determined value.

11. The system of claim 1, wherein the system for monitoring a water supply is configured to be installed within a property, and wherein the state change signal is a water shut off command when that property where the system for monitoring a water supply is installed within is not on fire.

12. The system of claim 1, wherein the computer system is further configured to transmit a portion of the user information to an emergency response system.

13. A system for monitoring a water supply, the system comprising:
 a solenoid valve having a state;
 a plurality of sensors configured to generate sensor information, wherein a first sensor of the plurality of sensors configured to generate flow information and a second sensor of the plurality of sensors configured to generate temperature information;
 a computer system, wherein the computer system is configured to:
 receive the flow information and the temperature information;
 generate a log that includes: (i) the state of the solenoid valve, and (ii) commands to alter the state of the solenoid valve; (iii) the flow information, and (iv) the temperature information;
 determine whether a predefined criteria is met based upon a comparison of the flow information and a threshold value; and
 if the predefined criteria is met and an authorized user interacts with a user interface of a mobile user computing device to select a time period, selectively transmit a portion of the log that corresponds to a selected time period set by the authorized user,
 in response to receiving the transmission, activating only user authorized display features of the mobile user computing device.

14. The system of claim 13, wherein the mobile user computing device is configured to display a user interface feature, and wherein said user interface feature is activated by a user, the mobile user computing device transmits a signal to the computing system.

15. The system of claim 14, wherein the computer system is configured to send the command to alter the state of the solenoid valve to the solenoid valve once said computer system receives the signal from the mobile user computing device.

16. The system of claim 13, wherein the predetermined criteria is based upon a time interval.

17. A system for monitoring a water supply, the system comprising:
 a solenoid valve having a state;
 a flow sensor configured to generate water flow information;
 a computer system, wherein the computer system is configured to:
 receive the water flow information generated by the flow sensor;
 store the water flow information in a log;
 determine whether to transmit user information to a mobile user computing device when a portion of the water flow information exceeds a threshold value;
 selectively transmit, the user information to the mobile user computing device over a communication network when the portion of the water flow information exceeds the threshold value and transmit an authorization to provide a shut off capability, wherein said user information includes a portion of the log;
 once the user information has been selectively transmitted to the mobile user computing device, selectively display a user interface feature on said mobile user computing device, wherein an interaction with said user interface feature is configured to send a change signal that is designed to change the state of the solenoid valve;
 receive from the mobile user computing device the state change signal in response to the interaction with the user interface feature that was displayed on said mobile user computing device;
 send the state change signal to the solenoid valve in order to change its state; and transmit confirmation that the state of the solenoid valve was changed to the mobile user computing device.

18. The system of claim 17, wherein a building has a main water line with a first extent and a second extent, and wherein said solenoid valve is configured to be positioned between the first and second extents of the main water line.

19. The system of claim 17, wherein said log can be displayed on at least one of the mobile user computing device and a third party computing device.

20. The system of claim 17, wherein the third party computing device is a device controlled by an insurer of a property where the system for monitoring a water supply is installed within.

* * * * *